United States Patent

Noguchi et al.

[11] Patent Number: 5,882,122
[45] Date of Patent: Mar. 16, 1999

[54] ROLLING BEARING AND SPINDLE APPARATUS

[75] Inventors: Shoji Noguchi; Katsuhiko Tanaka; Ikunori Sakatani; Keisuke Kimura; Kazuhiro Uemura; Hiroshi Nakajima; Toru Takamizawa, all of Kanagawa, Japan

[73] Assignee: NSK Ltd., Tokyo, Japan

[21] Appl. No.: 958,449

[22] Filed: Oct. 27, 1997

[30] Foreign Application Priority Data

| Oct. 25, 1996 | [JP] | Japan | 8-284083 |
| Mar. 6, 1997 | [JP] | Japan | 9-051973 |
| Mar. 26, 1997 | [JP] | Japan | 9-074144 |
| Jun. 27, 1997 | [JP] | Japan | 9-172133 |
| Jul. 15, 1997 | [JP] | Japan | 9-189862 |
| Sep. 22, 1997 | [JP] | Japan | 9-257041 |

[51] Int. Cl.⁶ ............................................. F16C 19/08
[52] U.S. Cl. ........................ 384/490; 384/512; 384/513
[58] Field of Search ............... 384/126, 99, 490, 384/491, 492, 512, 513

[56] References Cited

U.S. PATENT DOCUMENTS

| 4,883,370 | 11/1989 | Nakanishi | 384/490 |
| 5,463,490 | 10/1995 | Seto | 384/490 X |
| 5,547,291 | 8/1996 | Miyazaki et al. | 384/513 X |
| 5,560,717 | 10/1996 | Obara et al. | 384/512 |
| 5,603,576 | 2/1997 | Hirakawa et al. | 384/491 |
| 5,782,563 | 7/1998 | Muto et al. | 384/492 X |

*Primary Examiner*—Thomas R. Hannon
*Attorney, Agent, or Firm*—Sughrue, Mion, Zinn, Macpeak & Seas, PLLC

[57] ABSTRACT

A rolling bearing having a plurality of rolling elements interposed between an inner race and an outer race, wherein the number of the rolling elements is selected to be equal to a number having, as divisors, main low-frequency peak components of geometrical error of the inner and outer races to be assembled.

29 Claims, 14 Drawing Sheets

RESULT OF MEASUREMENT OF NRRO IN A BALL BEARING OF 12 BALLS (HAVING AN INNER DIAMETER OF 5mm, AN OUTER DIAMETER OF 13mm AND A WIDTH OF 3mm)
(ROTATIONAL SPEED 1800 rpm, Fa = 9.8N, GREASE LUBRICATION)

ROLLING BEARING AND SPINDLE APPARATUS

BACKGROUND OF THE INVENTION

The present invention relates to a rolling bearing and spindle apparatus used in a spindle motor of a hard disk device such as a magnetic disk device, or the like which in turn installed on an information equipment, an acoustic/image equipment and so on, or used in a precision machine such as a machine-tool main shaft, or the like, required to have a rotational precision, in which non-repeatable run-out (so generally called as NRRO) of the rotational vibration in a single bearing itself or in the spindle apparatus as a whole is suppressed. Particularly, the present invention relates to a rolling bearing and spindle apparatus in small size which are requested to have a high rotational precision.

Generally, the number of rolling elements in a rolling bearing is determined mainly on the basis of the stiffness and load capacity required for the bearing and further on the basis of the improvement of the life thereof, but the number of rolling elements is little taken into account with respect to the relation between the number of rolling elements and rotational precision.

For purposes of the rolling bearing used in a spindle motor of a hard disk device, or the like, rotational precision may be given priority over any other performance. In this case, rotational precision is generally improved by reducing the geometrical error (i.e. error of form or configuration occurred in a manufacturing or assembling process) of the inner and outer raceway surfaces and rolling elements and the dimensional difference between the rolling elements.

For example, an apparatus as shown in FIG. 15 is a spindle apparatus used in a conventional magnetic disk device.

The spindle apparatus is designed so that a hub 51 mounted with a disk 50 is supported on a shaft member 52 through two ball bearings 53 and 54. Respective outer races 53a and 54a of the ball bearings 53 and 54 are forced into through-holes 51a of the hub 51 by tight fitting and then fixedly bonded to the hub 51 with an adhesive agent. Respective inner races 53b and 54b of the ball bearings 53 and 54 are attached to the shaft member 52 by loose fitting and then bonded to the shaft member 52 with an adhesive agent. The reference numerals 53c and 54c designate balls which are rolling elements.

Even in the case where external force is applied to the conventional spindle apparatus, such attachment prevents the hub 51 from moving relative to the shaft member 52. Accordingly, even in the case where external vibration or external impact is applied when, for example, the conventional spindle apparatus is carried, the center of the hub 51 is prevented from being displaced relative to the center of the shaft member 52.

Describing now the case where in the conventional magnetic disk device, a plurality of disks 50 are mounted on the hub 51 in order to ensure the tracking characteristic of heads with respect to tracks on which signals are recorded, a servo signal for guiding the heads is written only on the lowermost disk surface of the disks 50.

Accordingly, after the servo signal is written in order to ensure the tracking characteristic of the plurality of heads, the centers of the plurality of disks 50 are not allowed to be displaced. Therefore, as described above, the conventional spindle apparatus is designed so that the fitting surfaces of the inner races 53b and 54b of the ball bearings 53 and 54 and the fitting surfaces of the outer races 53a and 54a of the ball bearings 53 and 54 are fixed.

To facilitate assembling of a spindle motor, a disk device maker, or the like, may provide the spindle apparatus in the form of a unit system. In the case, for example, the conventional spindle apparatus is designed so that the respective outer races 53a and 54a of the bearings 53 and 54 are forced into a sleeve 55 by tight fitting and fixed to the sleeve 55 with an adhesive agent as shown in FIG. 16. Further, the inner races 53b and 54b are fixed to the shaft 52 with an adhesive agent. Further, the hub 51 on which disks 50 are mounted is attached to the outer circumference of the sleeve 55.

In addition, in a conventional ball bearing used in a spindle motor of the magnetic disk device, the number of balls installed between the inner and outer races are generally in the range of 7–10. The balls are made of a high carbon chromium steel and has the Rockwell hardness of HRC 63–HRC 67 (i.e. the Vickers hardness of Hv 772–Hv 900).

Further, in a conventional ball bearing having a seal or a shielding plate on one end or both ends in the axial direction thereof, for the purpose of preventing the ball from being injured when the ball is rotated at high speed for a long time period, the ball bearing is generally filled with a grease, as a lubricating agent, an amount of which is set in the range of 10–15% of the entire spatial volume within the ball bearing.

In the aforementioned rolling bearing, it is, however, limited to reduce the geometrical error of the raceway surfaces of the inner and outer races 53a and 54a, the geometrical error of the rolling elements and the size difference between the rolling elements. There arises a problem that it is difficult to reduce non-repeatable run-out (NRRO) beyond such limitations.

Further, the recording density of magnetic disk devices is required to be higher in recent years. Accordingly, the width of a signal-recording track in the disks 50 is narrowed more remarkably, so that the non-repeatable run-out of the spindle apparatus as a whole is required to be reduced in order to ensure the tracking characteristic of the head with respect to the track.

It is, however, found from the recent researches that there is some limitation when only the non-repeatable run-out of the single ball bearings 53 and 54 to be used is reduced in order to reduce the non-repeatable run-out of the spindle apparatus.

That is, it is found that the roundness of the inner and outer races 53b, 54b, 53a and 54a fixed to the shaft member 52, or the like, by an adhesive agent are collapsed so that, for example, the raceway surfaces are deformed elliptically to make the non-repeatable run-out large because the non-repeatable run-out is apt to be increased by the influence of mounting errors when two ball bearings 53 and 54 are assembled and because it is difficult to apply an adhesive agent onto the fitting surfaces evenly.

Furthermore, it is found that, when the outer races 53a and 54a are forced into the hub 51, the roundness of the raceway surfaces are worsened to increase the non-repeatable run-out because the outer races 53a and 54a of the ball bearings 53 and 54 follow the shape of the lower-precise inner-diameter surface of the hub 51.

On the other hand, a recent information equipment, such as a magnetic disk device in particular, is required to rotate a spindle motor at a high speed to thereby make the data transfer rate high. Therefore, the high-speed durability of the bearings used in the spindle motor becomes especially important. That is, it becomes especially important that there is no increase in vibration and noise of the bearings even in the case where the bearings are used at a high speed for a long time period.

Conventionally, however, ball bearings have a problem that when the bearings are used at high speed rotation for a long time period balls are injured gradually and the vibration and noise of the bearings are increased in accordance with the damage of the balls, because the non-repeatable run-out is reduced by improving a machining accuracy of each balls and so on.

There is a case where a large-capacity magnetic disk device is required to largely increase the stiffness of the spindle motor because of the necessity of increasing the number of disks to be mounted on the magnetic disk device.

SUMMARY OF THE INVENTION

The present invention is to solve the aforementioned problems, so it is an object of the present invention to provide a rolling bearing in which the number of rolling elements is specified to suppress the non-repeatable run-out of a single bearing and to provide a spindle apparatus in which the non-repeatable run-out can be suppressed, apart from the fact that the geometrical error of raceway surfaces and rolling elements and the dimensional difference between the rolling elements are suppressed.

In addition to this, it is also an object of the present invention to provide a spindle apparatus excellent in high-speed durability and capable of being improved in stiffness.

In order to solve the above problem, according to a first aspect of the present invention, provided is a rolling bearing having a plurality of rolling elements interposed between an inner race and an outer race, wherein the number of the rolling elements is selected to be equal to a number having, as at least three divisors, main low-frequency peak components of geometrical error of the inner and outer races to be assembled.

In the above-mentioned construction according to a first aspect of the present invention, the rolling bearing may be a ball bearing for an information equipment and the number of the rolling elements is set to be 12, 16 or 18.

In addition, in the above-mentioned construction according to a first aspect of the present invention, the rolling bearing may be a ball bearing for a hard disk spindle apparatus and the number of the rolling elements is set to be 12, 16 or 18.

In the aforementioned configuration, the reason of attainment of suppression of the non-repeatable run-out will be described below.

Currently, it is known that the movement of a shaft center accompanying the rotation angle of a rolling bearing can be calculated theoretically on the basis of the balance of internal force by using the geometrical error of inner and outer raceway surfaces of the rolling bearing, the number of rolling elements, etc. as parameters (see Kyosuke Ono et al, "THEORETICAL ANALYSIS OF SHAFT VIBRATION SUPPORTED BY A BALL BEARING WITH SMALL SINUSOIDAL WAVINESS", IEEE TRANSACTION ON MAGNETICS, Vol. 32, No. 3, May 1996, pp. 1709–1714).

On the basis of the theoretical calculation formula, the inventor of the present application has developed a novel analysis program which can use, simultaneously, the geometrical error of inner and outer raceway surfaces, the geometrical error of rolling elements, the dimensional difference between the rolling elements, etc. as input parameters. Using the analysis program, the present inventor has calculated the maximum values of non-repeatable run-out while the number of outer race geometrical error peaks (2 to 10) and the number of rolling elements (7 to 10) are changed (in the condition in which: the maximum values are calculated at 256 points per turn in 50 turns; the total amplitude of geometrical error is 2 $\mu$m; and the geometrical error of rolling elements and the dimensional difference between the rolling elements are zero). Results as shown in Table 1 are obtained.

Although the value can be calculated to any decimal places, the resolution of a sensor actually used for measurement of vibration is limited to 0.001 $\mu$m. Accordingly, values smaller than 0.001 $\mu$m are regarded as zero in Table 1 taking the verification of calculated values into account. Also in the case where geometrical error is given to the inner race, the same results as shown in Table 1 can be obtained.

The geometrical error given to the aforementioned outer raceway surface is made ideal sinusoidal wave expressed by $A \cdot \sin B\theta$ (in which A is the amplitude of geometrical error, B is the number of error peaks, and $\theta$ is an angle).

TABLE 1

| the number of rolling elements | the number of outer raceway geometrical error peaks | | | | | | | | |
|---|---|---|---|---|---|---|---|---|---|
| | 2 | 3 | 4 | 5 | 6 | 7 | 8 | 9 | 10 |
| 7  | 0.007 | 0.129 | 0.13  | 0.007 | 2.001 | 0     | 2.003 | 0.007 | 0.132 |
| 8  | 0     | 0.006 | 0     | 0.006 | 0     | 1.999 | 0     | 1.999 | 0     |
| 9  | 0.001 | 0     | 0.13  | 0.13  | 0     | 0.001 | 2.005 | 0     | 2.006 |
| 10 | 0     | 0.006 | 0     | 0     | 0     | 0.006 | 0     | 2.008 | 0     |
| 11 | 0     | 0.001 | 0.006 | 0.129 | 0.129 | 0.006 | 0.001 | 0     | 2.003 |
| 12 | 0     | 0     | 0     | 0     | 0     | 0     | 0     | 0     | 0     |
| 13 | 0     | 0.001 | 0.006 | 0     | 0.13  | 0.13  | 0     | 0.006 | 0.001 |
| 14 | 0     | 0     | 0     | 0.006 | 0     | 0     | 0     | 0.006 | 0     |
| 15 | 0     | 0     | 0.001 | 0     | 0     | 0.13  | 0.129 | 0     | 0     |
| 16 | 0     | 0     | 0     | 0.006 | 0     | 0     | 0     | 0     | 0     |
| 17 | 0     | 0     | 0.001 | 0     | 0.006 | 0     | 0.131 | 0.131 | 0     |
| 18 | 0     | 0     | 0     | 0     | 0     | 0     | 0     | 0     | 0     |
| 19 | 0     | 0     | 0     | 0.001 | 0.006 | 0     | 0     | 0.131 | 0.131 |
| 20 | 0     | 0     | 0     | 0     | 0     | 0.006 | 0     | 0     | 0     |

Note: In the Table, the unit of each of all the calculated values is $\mu$m.

With respect to the relation between the number of rolling elements and the number of inner and outer raceway surface geometrical error peaks as a subject of the analysis, it is apparent from Table 1 that non-repeatable run-out does not appear when the number of rolling elements is an integer multiple of the number of geometrical error peaks, that is, when the number of rolling elements is selected so as to have, as a divisor, the number of geometrical error peaks possessed by low-frequency peak components of raceway surface geometrical error of inner and outer races assembled. (For example, if the number of geometrical error peaks is three (3), the number of rolling elements would be nine (9), twelve (12), fifteen (15) or the like, or if the number of geometrical error peaks is four (4), the number of rolling elements would be eight (8), twelve (12), sixteen (16) or the like.)

That is, from the results of the analysis, the non-repeatable run-out of a rolling bearing using outer and inner races is suppressed and, accordingly, the non-repeatable run-out of a spindle motor, or the like, containing the rolling bearing is suppressed, if the number of rolling elements is selected to be equal to a number having, as a divisor, the number of geometrical error peaks possessed by the low-frequency peak components of outer raceway surface geometrical error as a subject of the analysis. (For example, if the geometrical error peaks is three (3), nine (9), twelve (12), fifteen (15) or the like which has three (3) as its divisor, can be selected as the number of the rolling elements.)

From the aforementioned reason, the non-repeatable run-out of the rolling bearing can be reduced, when the number of rolling elements is selected to be equal to a number having, as a divisor, the number of main low-frequency peaks of raceway surface geometrical error of inner and outer races assembled.

Incidentally, the number of geometrical error peaks possessed by the main low-frequency peak components of raceway surface geometrical error of inner and outer races assembled is not limited to single. In most cases, either inner race or outer race has a plurality of the numbers of the peaks. When the race has a plurality of the numbers of peaks, the number of the rolling elements is preferably selected to be a number having, as a divisor, all of these numbers of geometrical error peaks in the inner and outer races. (For example, if one of the numbers of peaks is three (3) and the other is five (5), the number of the rolling elements is selected to be fifteen (15) having, as its divisors, the three (3) and the five (5). In addition, if the numbers (digits) of peaks are two (2), three (3) and four (4), the number of the rolling elements is selected to be twelve (12), which has, as its divisors, all of these numbers of two (2), three (3) and four (4). Namely, when the race has a plurality of the numbers of peaks, the number of the rolling elements is preferably selected to be equal to a common multiple of all of these numbers of peaks.

The number of geometrical error peaks in actual inner and outer raceway surfaces is not always constant. However, when the number of rolling elements is selected to be a value which has divisors representing the respective numbers of various geometrical error peaks in main low-frequency peak components of raceway surface geometrical error, the possibility that the non-repeatable run-out of a single rolling bearing caused by the geometrical error of raceway surfaces can be reduced with respect to the same number of rolling elements increases as the number of such divisors is made larger.

Referring again to Table 1, facts other than those described above can be found as follows.

(1) When the number of rolling elements is an odd number, such as 7, 9, 11 or 13, having a small number of divisors, non-repeatable run-out appears remarkably if the number of error peaks is not contained in the divisors.

(2) When the number of rolling elements is a number such as 12 or 18, that is, when the number of rolling elements is equal to a number having many divisors, non-repeatable run-out does not appear if the number of peaks is not larger than 10.

That is, as the number of divisors increases, the possibility that non-repeatable run-out does not appear increases even in the case where the number of error peaks is not contained in the divisors.

Contrariwise, when the number of rolling elements is discussed on the basis of the number of geometrical error peaks, the following facts are found.

When the number of geometrical error peaks is Y and the number of rolling elements is Z, (1) non-repeatable run-out does not appear in the case of Z=nY (n: natural number);

(2) non-repeatable run-out appears most remarkably in the case of Z=Y±1; and (3) non-repeatable run-out appears also in the case of Z=(2Y±1)/n or Z=(3Y±1)/n (n: natural number).

On the other hand, error amplitude corresponding to the number of geometrical error peaks can be known from measured roundness data by harmonic analysis. When harmonic analysis is actually applied to geometrical error data obtained by measurement of the roundness of the inner and outer raceway surfaces of ball bearings for a hard disk spindle motor, results as shown in FIG. 4 are obtained. The results are obtained in the condition in which ten inner and outer races in total are measured and error amplitude is analyzed for each number of geometrical error peaks.

It is apparent from FIG. 4 that geometrical error of inner and outer raceway surfaces of ball bearings for a hard disk spindle motor is generally mainly composed of geometrical error peak components of 2 to 10 peaks. That is, it is found that it is sufficient if 2 to 10 peaks are taken into account.

Note that these phenomenon is not limited to a ball bearing used for a hard disk spindle motor. The same phenomenon is appeared in a rolling bearing for rotatably supporting high speed rotated elements of the other information equipment. In the aforementioned descriptions, the ball bearing used for the hard disk spindle is explained as a typical one among them.

From the above description, it is found that the number of rolling elements is preferably selected to be equal to a number having many divisors among integers in a range of from 2 to 10.

From Table 1, it is found that non-repeatable run-out caused by geometrical error is zero in each outer/inner race having any number of geometrical error peaks in a range of from 2 to 10 if the number of rolling elements is selected to be 12 or 18. Either 12 or 18 has four divisors of from 2 to 10. That is, the number, 12, of rolling elements has four divisors 2, 3, 4 and 6 as the divisor in a range of from 2 to 10 and the number, 18, of rolling elements has four divisors 2, 3, 6 and 9.

It is apparent from the above description that, if the number of rolling elements has four or more divisors of main low-frequency peak components of inner and outer raceway surface geometrical error, the number of rolling elements is effective for suppression of non-repeatable run-out even in the case where more or less working error exists in main low-frequency peak components of outer raceway surface geometrical error.

As described above, because the number of main geometrical error peaks having large geometrical error amplitude is not larger than 10, the selection of the number of rolling elements to 12 or 18 having four divisors in a range of from 2 to 10 is effective for suppression of non-repeatable run-out of a spindle motor ball bearing used in a hard disk device containing the ball bearing.

It is apparent from this fact that the rotational precision of the hard disk spindle motor can be improved when the spindle motor ball bearing used in the hard disk device is used. In addition, when the spindle motor ball bearing is assembled in the another information equipments, the same effect can be enjoyed.

Because a rotating body of the hard disk spindle motor is generally supported by two bearings, the rotational precision of the spindle motor is improved when the two ball bearings according to the present invention are provided or when one ball bearing according to the present invention is provided (for example, a dynamic pressure bearing is used as the other ball bearing). In addition, when the spindle motor ball bearing is assembled in the another information equipments, the same effect can be enjoyed.

Further, it is apparent from Table 1 that, even in the case where the number of rolling elements is selected to be 16 having three divisors in a range of from 2 to 10, non-repeatable run-out can be suppressed effectively because maximum non-repeatable run-out values are zero except for five peaks. That is, when the number of rolling elements is 16, the number has three divisors 2, 4 and 8 as divisors in a range of from 2 to 10.

That is, it is apparent that suppression of non-repeatable run-out is effective also in the case where the number of rolling elements has three or more divisors in a range of from 2 to 10.

From the aforementioned point of view, the number of rolling element is preferably selected to be a number having as at least three divisors, main low-frequency peak components of geometrical error of the inner and outer races to be assembled.

Further, from the aforementioned point of view, the number of rolling elements is preferably selected to be 12, 16 or 18 according to the invention.

In the case where the number of rolling elements has three or more divisors, the effect increases as the number of divisors increases. It is thought of that the aforementioned effect will be obtained even in the case where the number of rolling elements is 24, 36, 48, or the like, if rolling elements of this number can be arranged in the bearing.

Actually, there is some case where the number of error peaks in each low-frequency peak component is mainly not smaller than 11 in correspondence with individual characteristic of a processing machine for processing the inner and outer raceway surfaces, or the like. In this case, the number of rolling elements is selected to be a number containing, as a divisor, the number of actually main error peaks.

With respect to a ball bearing used for the information equipment, such as the hard disk spindle motor in particular, the diameter of each rolling element (ball) need be selected to be a small value in order to increase the number of rolling elements put in the bearing if the external size of the bearing is assumed to be constant. If the diameter of the ball is selected to be a small value, the inner and outer races can be designed to be thicker. If the inner and outer races can be designed to be thicker, both high precision workability and large strength against deformation can be obtained so that higher rotational precision can be attained.

That is, reduction of the diameter of the ball is effective for improvement of rotational precision of a small-size bearing from the double viewpoint of reduction in non-repeatable run-out and increase in stiffness. From this viewpoint, a more remarkable effect is obtained when the configuration of the present invention is applied to a hard disk device spindle motor ball bearing having rolling elements each with a outer diameter of 2 mm or smaller. The ball size in the present invention is, however, not limited to a value of 2 mm or smaller.

As a way of thinking reverse to the above description, there is means of designing the outer diameter of an outer race larger than that of the conventional outer race without changing the inner diameter of an inner race in order to assemble large-diameter rolling elements which are easy to improve the machining accuracy of the rolling elements (balls).

Further, the above-mentioned object can also be attained by a rolling bearing, according to a second aspect of the present invention, having a plurality of rolling elements interposed between an inner race and an outer race, and a lubricating agent filled within the rolling bearing, wherein the number of the rolling elements is set to be 12 or more, and an amount of the lubricating agent is set to be less than 10% of a spatial volume within the rolling bearing.

Note that the spatial volume within the bearing defines a volume which is calculated by deducting the volumes of the cage and the whole of rolling elements installed between the inner and outer races from the volume of space positioned between the inner peripheral surface of the outer race and the outer peripheral surface of the inner race.

Generally, in a conventional ball bearing used for the spindle motor, the number of rolling elements was set to be seven from ten. However, as shown in Table 1, in the case where the number of rolling elements is selected to be 12 or more which is larger than these conventional ranges, preferably an even number, such as 12, 14, 16, 18 and so on, the bearings are hardly affected by waviness caused by the inner and outer races as compared with the conventional one.

From the aforementioned point of view, the number of rolling elements is preferably selected to be 12 or more according to the invention, to thereby reduce the non-repeatable run-out.

In particularly, as mentioned above, the reduction of the non-repeatable run-out is more effective when the number is set to be 12, 16 or 18.

In the case where the number of the rolling elements is increased while the size of the inner and outer race is kept maintained, in term of the design thereof, it is necessary to make the rolling element smaller in size. In this case, each raceway of the inner and outer races comes closer to a pitch circle thereof and in turn the spatial volume within the ball bearing is reduced, so that an absolute quantity of the grease filled within the bearing is decreased. Under this circumstance (where the absolute quantity of lubricant agent is small), in the case where the rolling accuracy is improved only reliant on a manufacturing accuracy of each rolling elements or raceway surfaces as the conventional method did, the bearing vibration is apt to be larger because of the surface deterioration of the ball used at the high-speed rotation for a long time period.

As contrary to this, in the first and second aspect of the present invention, the non-repeatable run-out is reduced by specifying the number of the rolling elements, so that even in the case where the surface deterioration of the ball used at the high-speed rotation for a long time period is progressed, the bearing vibration can be suppressed as compared with the conventional one. Consequently, the amount of lubricating agent can be reduced while a rotating accuracy is kept maintained.

Further, as the conventional manner, it is found by the present inventors that when the grease the amount of which is in the range of from 10% to 15% of the spatial volume within the bearing is filled, the absolute quantity of the grease becomes too large, so that the non-repeatable run-out is increased by an agitating resistance of the grease and also a variation of the non-repeatable run-out is increased. It is also found that in order to make the non-repeatable run-out and the variation smaller it is effective to reduce the amount of the lubricating agent as much as possible.

In view of this, according to the second aspect of the present invention, the amount of the lubricating agent is set to be less than 10% of the spatial volume within the bearing. Thereby, it becomes possible to provide a bearing with a small non-repeatable run-out and a small variation of the non-repeatable run-out.

The critical significant of the 10% of the spatial volume within the bearing will be hereinafter described.

FIG. 19 shows a result of the test where maximum values of the non-repeatable run-out of the ball bearing having 12 balls are obtained while an amount of lubricating agent filled into the bearing are varied one another.

As clearly shown in FIG. 19, when the number of the balls used in the bearing is equal to one another, the maximum value of the none-repeatable run-out is decreased in proportion to the decrease of the amount of the lubricating agent filled in the bearing. Namely, the low non-repeatable run-out can be effectively obtained when the amount of the lubricating agent is set to be less than 10% of the spatial volume within the bearing. Preferably, when the amount of the lubricating agent is set to be less than 8% of the same the reduction of the non-repeatable run-out is lowed is more effective. More preferably, when the amount is set to be less than 6% the reduction is further more effective.

"OIL" represented in FIG. 19 is directed to an oil lubricating condition in which an oil is filled and applied onto the raceway surfaces of the inner and outer races. In other words, it is a marginal condition capable of filling with the lubricating agent, or a condition where the filled amount of the lubricating agent is set to be a value in adjacent to 0% of the spatial volume within the bearing.

When the ball is made of a ceramic material, it is possible to prevent the deterioration of the ball surface caused by the rotation under a dried-up lubricating condition where the amount of the lubricating agent is very small. As a result of this, it is possible to provide a bearing excellent in high-speed durability even in the case where the filling amount of the lubricating agent is set to be 4% or less of the spatial volume thereof or even in the above-mentioned oil lubricating condition where the amount of the lubricating agent is set at a value in adjacent to 0% thereof. Therefore, a low non-repeatable run-out and a high-speed durability can be simultaneously obtained by using the ceramic ball.

Note that although it is preferable to use the ball made of the ceramic as described above, the material of the ball may be replaced with a hard metal having the surface hardness of Hv 950–Hv 1,800 or bearing steel having the surface hardness of Hv 900 or more.

Furthermore, the above-mentioned object can also be attained by a rolling bearing, according to a third aspect of the present invention, having a plurality of rolling elements interposed between an inner race and an outer race, and a lubricating agent filled within the rolling bearing, wherein the number of the rolling elements is set to be 12 or more, and the surface hardness of the rolling element is set to be more than Hv 900.

As the same reason of the fourth aspect of the present invention, the number of rolling elements may be selected to be 12 or more, in such a manner that the bearings are hardly affected by waviness caused by the inner and outer races as compared with the conventional one and in turn the non-repeatable run-out can be reduced. Preferably, the number of the rolling elements is an even number and not less than 12. The number of the rolling elements is set to be 12, 16 or 18 more preferably. In this time the efficiency can be increased more.

In addition to specify the number of rolling elements, if the surface hardness of the rolling elements is set to have a hardness of Hv 900, not only the deterioration of the rolling elements can be lowered under the dried-up lubricating condition but also it is hardly affected to generate a fretting in use or transportation thereof, so that the noise resulted from the bearing in general use, in long time use particularly, can be suppressed.

In practice, the rolling element having the surface hardness of Hv 900 or more can be obtained by making it a ceramic material, a hard metal, or the like.

The ceramic material generally provide a surface hardness of Hv 1,400–Hv 2,200. The ceramic material, however, is expensive and has a problem in cost.

On the other hand, although the hard metal generally provide the surface hardness of Hv 950–Hv 1,800 which smaller than the ceramic material, there are advantages that when the hard metal is used the surface hardness of the hard metal rolling element can be satisfy the requirements of the present invention and its cost is cheap. Further, there is an advantage that when an electric conductivity is required, it is preferable to use the metal ball rather than the ceramic ball.

Although it is difficult to get and ensure the hardness which is close to that of the ceramic or hard metal, a conventional bearing steel can, of course, be utilized by improving the surface hardness of the rolling elements. In practice, the surface hardness can be increased exceed Hv 900, which satisfies the requirement according to the present invention, by hardening at temperature of 1200° C. or more.

In the third aspect of the present invention, it is possible to provide a rolling bearing having a low non-repeatable run-out and a small variation thereof, in such a manner that the amount of the lubricating agent filled in the bearing is made less than 10% of the spatial volume within the bearing, preferably 8% or less, and more preferably 6% or less, as taught by the second aspect of the present invention.

Further, in the case where the rolling element is made of ceramic material, it is possible that the amount of the lubricating agent filled in the bearing is made 4% or less of the spatial volume within the bearings or that the amount of the lubricating agent is set to be a value in adjacent to 0% of the spatial volume so called as a oil lubricating condition.

According to a fourth aspect of the present invention, provided is a spindle apparatus in which a rotating body having disks mounted thereon is rotatably supported to a fixing member through two or more support bearings at least one of which is a ball bearing, wherein at least one of outer and inner races constituting the ball bearing is loosely fitted to the rotating body or the fixing member.

In the present invention, at least one of outer and inner races in each of ball bearings constituting a support bearing is mounted by loose fitting. Accordingly, increase of non-repeatable run-out based on error in mounting the ball bearing and collapse of roundness caused by forcing of races into and adhesive deformation is avoided. As a result, reduction of non-repeatable run-out of the spindle apparatus is attained.

In this occasion, the number of balls which are rolling elements put in each ball bearing is preferably selected to be 12, 16 or 18. When the number of balls is limited in this manner, the influence of the collapse in shape of the outer and inner raceway surfaces on the non-repeatable run-out is reduced by the aforementioned function and, accordingly, the non-repeatable run-out of a single ball bearing per se is reduced. As a result, the non-repeatable run-out of the spindle apparatus as a whole can be reduced.

In the fourth aspect of the present invention, it is preferable that the amount of the lubricating agent filled in the bearing is made smaller than 10% of the spatial volume within the bearing, preferably 8% or less, and more preferably 6% or less. In the case where the amount of the lubricating agent is limited into such values, it is hardly affected by an influence caused by the non-repeatable run-out on the basis of the lubricating agent and in turn the non-repeatable run-out of the ball bearing itself is made smaller. As a result, the non-repeatable run-out of the entire spindle apparatus can be reduced.

When at least one of the outer and inner races of the ball bearing is mounted by loose fitting, there is a possibility that the position of a disk mounted on a rotating body may be displaced more or less. Therefore, when a plurality of disks are to be mounted on a rotating body, servo signals are preferably recorded on the disks respectively. The servo signals recorded on the disks respectively in this manner permit more or less displacement of the centers of the disks caused by external vibration or external impact loaded at the time of transportation. As a result, even in the case where a plurality of disks are mounted, both fitting surfaces of the inner and outer races of the ball bearing need not be always fixed.

In this occasion, the outer race side of the ball bearing, that is, the outer race is preferably attached to a rotating body or a fixing member by loose fitting, and a cushioning member is preferably provided (in a loose fitting portion) between the outer circumference of the outer race and the rotating body or fixing member.

However, instead of the above-mentioned structure the cushioning member may be disposed between the inner circumference of the inner race and said rotating body or said fixing member.

When the cushioning member is provided, the outer race is supported in a damper manner to the rotating body or fixing member. When, for example, the outer race is attached to the rotating body, vibration transmitted to the rotator and, accordingly, to the disks though the outer race of the ball bearing is cut off or reduced. As a result, the influence of vibration caused by the ball bearing or caused by the mounting of the ball bearing is reduced, so that the non-repeatable run-out of the spindle apparatus is reduced and, accordingly, the non-repeatable run-out of the disks to be mounted is reduced.

The cushioning member can be achieved by the provision of an air or oil film in the loose fitting portion. The oil film can be achieved by a lubricant such as oil, grease, or the like, filled in the loose fitting portion.

Assuming now air, oil and grease as three kinds of fluids used in the loose fitting portion, then the right material selected from the three kinds of fluids can be preferably put in the right place because the three kinds of fluids are considered to be as good as one another.

Of the three kinds of fluids, air is considered to be easier to handle and has a considerable effect for cutting off the vibration of the bearing portion though air has no damping effect as can be expected.

As the oil, rust preventing oil (which need be selected from not-easily-volatile oil) applied to the bearing or oil (applied by oil plating) used for fine-amount oil lubrication can be used directly. When these kinds of oil are used, the work of wiping off the rust preventing oil or fine-amount lubricating oil on the bearing becomes unnecessary so that assembling becomes easy.

Incidentally, it is thought of that oil having a viscosity of 3 $mm^2/sec$ to 50000 $mm^2/sec$ can be used as the above-mentioned oil. To obtain the optimum damping effect, the viscosity of oil may be selected correspondingly to the gap of the loose fitting portion.

As the grease, soap grease (lithium, sodium, calcium, barium, composite soap and mixture soap thereof) and nonsoap grease (urea, bentonite, PTFE, carbon black) can be used.

In this occasion, when the outer race rotates (the rotating body is mounted), grease in which the lubricant less scatters is preferable to oil. Further, when the consistency of the grease used is selected to be not smaller than 2, preferably not smaller than 4, the scatter of grease caused by centrifugal force is preferably little.

Further, a preload toward the axial direction is preferably given to the outer race mounted by loose fitting. By the given preload, the saccadic movement of the bearing per se is eliminated so that the outer race is fixed to the rotating body or fixing member even in the case where the outer race is mounted by loose fitting. In this case, because the preload toward the axial direction is given, there is no bad influence on the roundness of the outer raceway surface though the preload is given.

Further, the inner raceway surface of the ball bearing is preferably provided directly in the shaft member (rotating body or fixing member) for mounting the inner race. In this manner, the size of each of balls which are rolling elements can be designed to be large even in the case where the number of balls is not smaller than 12. As a result, it becomes easy to process the balls and assemble the ball bearing.

Further, when ceramic balls are used as rolling elements, the balls are less injured even if they are used for a long time because not only the mass of the rolling elements is small so that the spin friction is less at the time of high-speed rotation, the heating of the bearing is less, and the degradation of used grease is less but also the hardness of the rolling element per se is high.

Furthermore, when such ceramic balls are used as rolling elements, the rolling elements can endure high-speed rotation by simply applying oil onto the raceway because the hardness of the rolling elements is so high that the balls are hardly injured even in the case where the balls are lubricated with a small amount of lubricating agent. If the balls are lubricated with a small amount of oil as described above, the change of rotational accuracy caused by entrainment of grease between the raceway and the balls like in grease lubrication becomes less so that non-repeatable run-out is improved.

Further, in order to increase the stiffness, the deep groove ball bearings may be replaced by angular contact ball bearings so that as many balls large in rolling element diameter as possible are assembled.

In addition, the above-mentioned object can also be attained by a rolling bearing, according to a fifth aspect of the present invention, a rolling bearing includes a plurality of rolling elements interposed between an inner race and an outer race in which the number of the rolling elements is selected by the steps comprising:

setting the number of the rolling element to be equal to a number having, as divisors, the main low-frequency peak components of geometrical error of the inner and outer races to be assembled.

In the above-mentioned rolling bearing, the setting steps may comprise the steps of:

setting the number of the rolling element to be equal to a number having, as at least three divisors, the main low-frequency peak components.

In addition, in the above-mentioned rolling bearing, the setting steps may comprise the steps of:

setting the number of the rolling element to be equal to a number having, as at least three divisors of from 2 to 10, the main low-frequency peak components.

Further, in the above-mentioned rolling bearing, the number of the rolling elements is preferably set to be 12, 16 or 18.

Furthermore, in the above-mentioned rolling bearing, the rolling bearing may be a rolling bearing used for an information equipment or a ball bearing for a hard disk spindle apparatus.

DESCRIPTION OF THE PREFERRED EMBODIMENTS

The mode for carrying out the present invention will be described below with reference to the drawings.

Although a ball bearing will be described as an example of the rolling bearing according to this mode, the invention can be applied to other rolling bearings such as a roller bearing, or the like.

Figure 1:
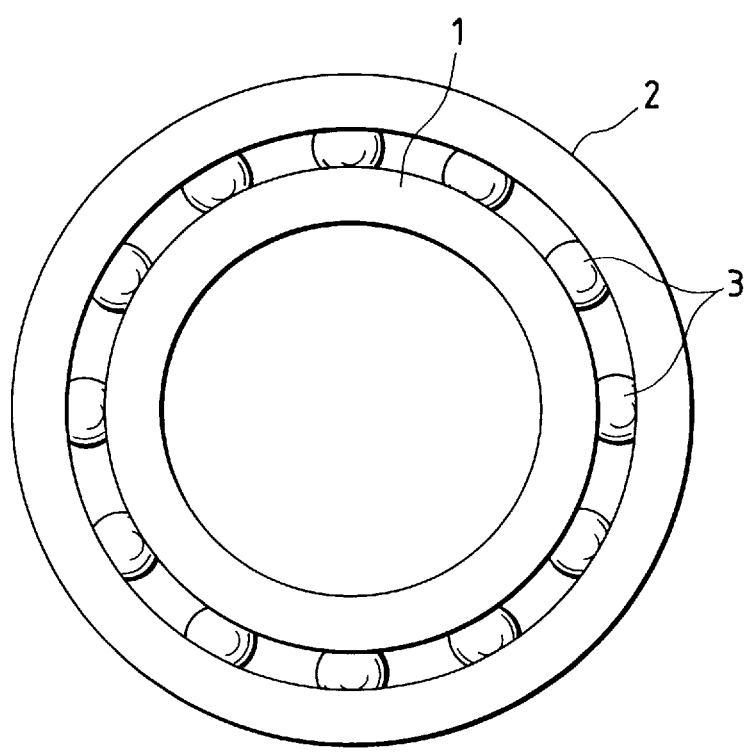
FIG. 1 is a view for explaining a rolling bearing according to an embodiment of the present invention.

As shown in FIG. 1, the rolling bearing in this embodiment comprises an inner race 1, an outer race 2 disposed so as to be concentric with the inner race 1, and a plurality of balls 3 disposed between opposite raceway surfaces of the inner and outer races 1 and 2 and serving as rolling elements.

In this mode for carrying out the invention, the number of balls is selected to be 12.

Further, the inner and outer races 1 and 2 and the balls 3 are processed so that the geometrical error of the raceway surfaces of the inner and outer races 1 and 2 and the balls 3 and the dimensional difference between the balls 3 are as small as possible.

In the case where the ball bearing which is a rolling bearing configured as described above is used, the rotational precision of the bearing is improved when the processing precision of the inner race 1, the outer race 2 and the balls 3 is set to be high in the conventional manner. In this mode for carrying out the invention, in addition to the improvement of geometrical precision, the influence of geometrical error of raceway surface geometrical error peak components with geometrical error peaks, the number of which is in the range of 2 to 10, which are at least main low-frequency peak components of general raceway surface geometrical error of the inner and outer races 1 and 2 can be avoided when the number of balls is limited to 12. As a result, the rotational precision of the bearing is improved more greatly.

Although the aforementioned mode for carrying out the invention has shown the case where the number of balls is 12, it is apparent from Table 1 that the number of balls may be limited to 18 having four divisors among integers of from 2 to 10 in the same manner as 12, to 16 having three divisors or to 24, 36, 48, or the like, having five or more divisors.

That is, a suitable number is preferably selected from the aforementioned numbers in terms of characteristics other than the rotational precision, such as stiffness of the bearing, load capacity of the bearing, etc.

Further, the raceway surface geometrical error of the inner and outer races 1 and 2 processed by a processing machine in advance may be measured to calculate the range of the numbers of geometrical error peaks as a subject of the processing machine. When, for example, the values of the numbers of peaks are 4 and 16, the number of balls can be selected to be 16 or an integer multiple thereof such as 32, etc., having, as divisors, at the least these values.

In order to reduce the non-repeatable run-out in the high speed rotation and the high speed durability, it is preferable to use a ball made of a ceramic or the like having the surface hardness of more than Hv 900 and the number of such ball is set to be 12 or 18.

Further, it is preferable to use it in combination with a small amount of lubricating agent.

When the grease is used as a lubricating agent, the amount of the lubricating agent filled in the bearing is set to be less than 10% of the spatial volume within the bearing, preferably 8% or less, and more preferably 6% or less.

As mentioned above, when the amount of the lubricating agent is specified, it is possible to suppress an agitating resistance on the basis of the excess amount of the lubricating agent and to reduce the non-repeatable run-out and the variation thereof. In this case, the non-repeatable run-out is reduced by specifying the amount of the lubricating agent, so that the limitation as to the number of the rolling elements can be alleviated. Namely, the number of the rolling elements is set to be 12 or more, particularly odd number not less than 12, the reduction of the non-repeatable run-out can be effective.

In addition, angular contact ball bearings may be used so that as many rolling elements as possible can be assembled even in the case where the number of rolling elements is increased to 12 or 18.

Further, a ball bearing which is designed so that the outer diameter of the outer race is larger than that of the conventional outer race while the inner diameter of the inner race is not changed may be used in order to assemble large-diameter rolling elements which are easy to improve the machining accuracy of the rolling elements (balls).

As an example, the present invention was applied to ball bearings having an inner diameter range of from 3 to 6 mm$\phi$ as ball bearings used in magnetic disk device spindle motors, or the like. As a result, it was confirmed that the effect of reducing non-repeatable run-out was remarkable when steel balls in which the difference in diameter between the balls (rolling elements) was not larger than 70 nm (0.07 $\mu$m) were employed as balls. It was further confirmed that the effect of reducing non-repeatable run-out was improved more greatly when the difference in diameter between the balls is selected to be not larger than 50 nm, preferably not larger than 40 nm.

Furthre, it found that in order to obtain a significant reduction of the non-repeatable run-out, it is necessary to set the difference in diameter between the balls is selected to be not larger than 30 nm.

Figure 17:
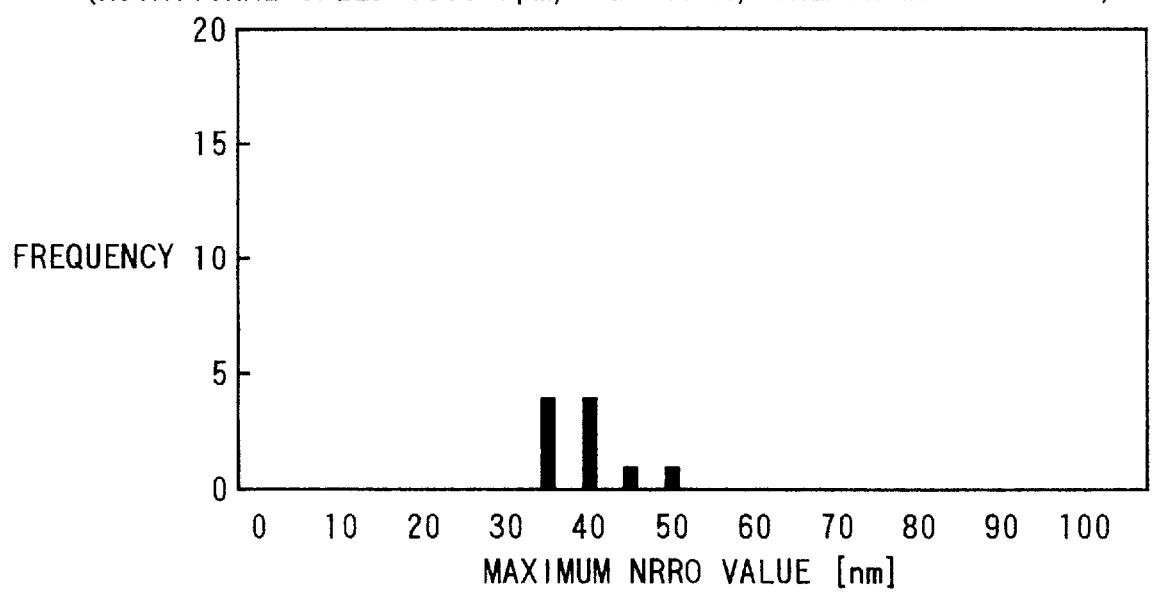
FIG. 17 shows an example of measurement for confirming to what extent non-repeatable run-out (NRRO) is improved in comparison between the case where 12 balls are used in a ball bearing.
Figure 18:
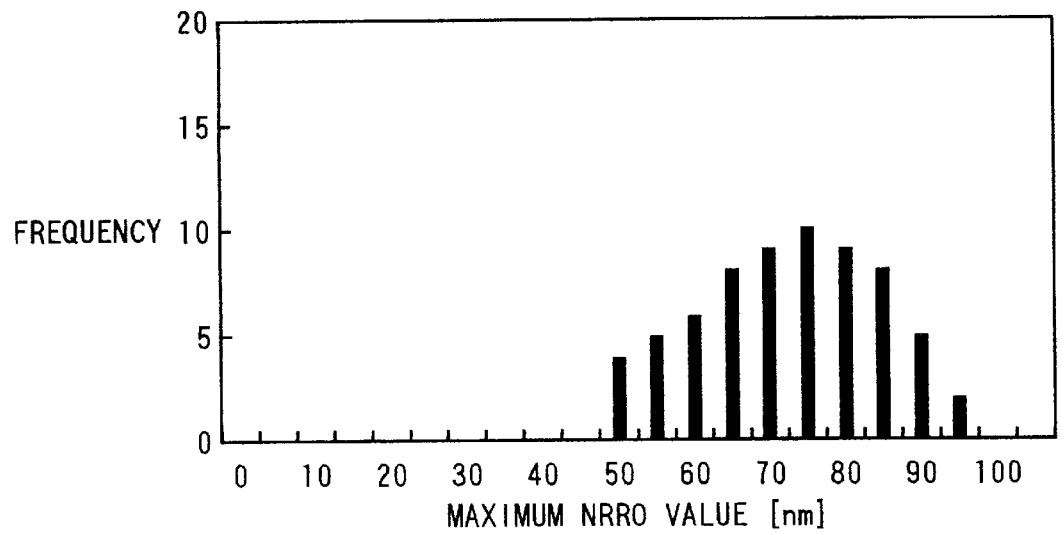
FIG. 18 shows an example of measurement for confirming to what extent non-repeatable run-out (NRRO) is improved in comparison between the case where 8 balls are used in a ball bearing according to the present invention and the conventional case where 8 balls are used.
Figure 19:
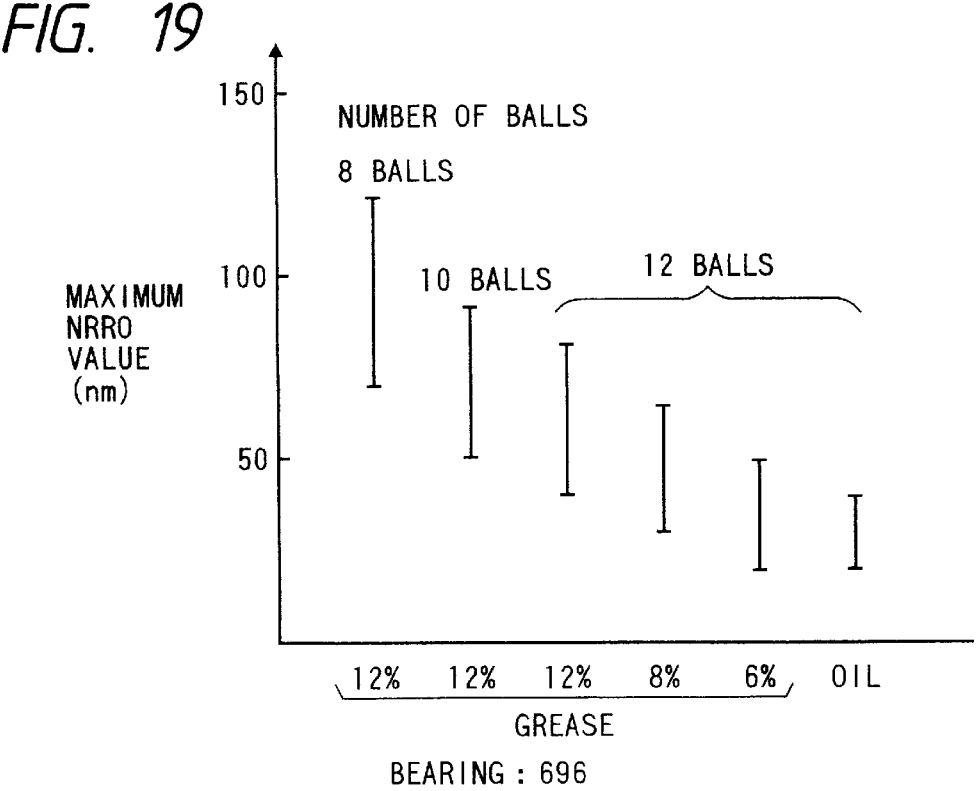
FIG. 19 shows a result of the test where maximum values of the non-repeatable run-out of the ball bearing having 12 balls are obtained while an amount of lubricating agent filled into the bearing are varied one another.

FIG. 17 shows an example of measurement for confirming to what extent non-repeatable run-out (NRRO) is improved in comparison between the case where 12 balls are used in a ball bearing (having an inner diameter of 5 mm, an outer diameter of 13 mm and a width of 3 mm) for a hard disk spindle motor according to the present invention and the conventional case where 12 balls are used. FIG. 18 shows an example of measurement for confirming to what extent non-repeatable run-out (NRRO) is improved in comparison between the case where 8 balls are used in a ball bearing according to the present invention and the conventional case where 8 balls are used.

In FIGS. 17 and 18, "Fa" is directed to an axial load. It is apparent from the result of the comparisons that NRRO in the conventional case of 8 balls is in a range of from 50 to 100 nm whereas NRRO in the case of 12 balls is improved to be not larger than 50 nm.

Assuming now that the outer diameter of the bearing is constant, the respective diameters of rolling elements need be reduced in order to mount a large number of rolling elements. Further, if the ball size is reduced in the aforementioned manner, the inner and outer races can be set to be thick. If the inner and outer races can be set to be thick, both high processing precision and large strength against deformation can be obtained. Accordingly, higher rotational precision can be achieved. That is, reduction of the ball size as well as reduction of non-repeatable run-out is effective for improvement of rotational precision of a small-size bearing in terms of increase of stiffness of the inner and outer races.

An embodiment will be described below in the case where a rolling bearing in which the number of rolling elements is selected to be equal to a number having, as many divisors, main low-frequency peak components of raceway surface geometrical error of the inner and outer races 1 and 2 assembled is applied to a hard disk device spindle motor.

Figure 2:
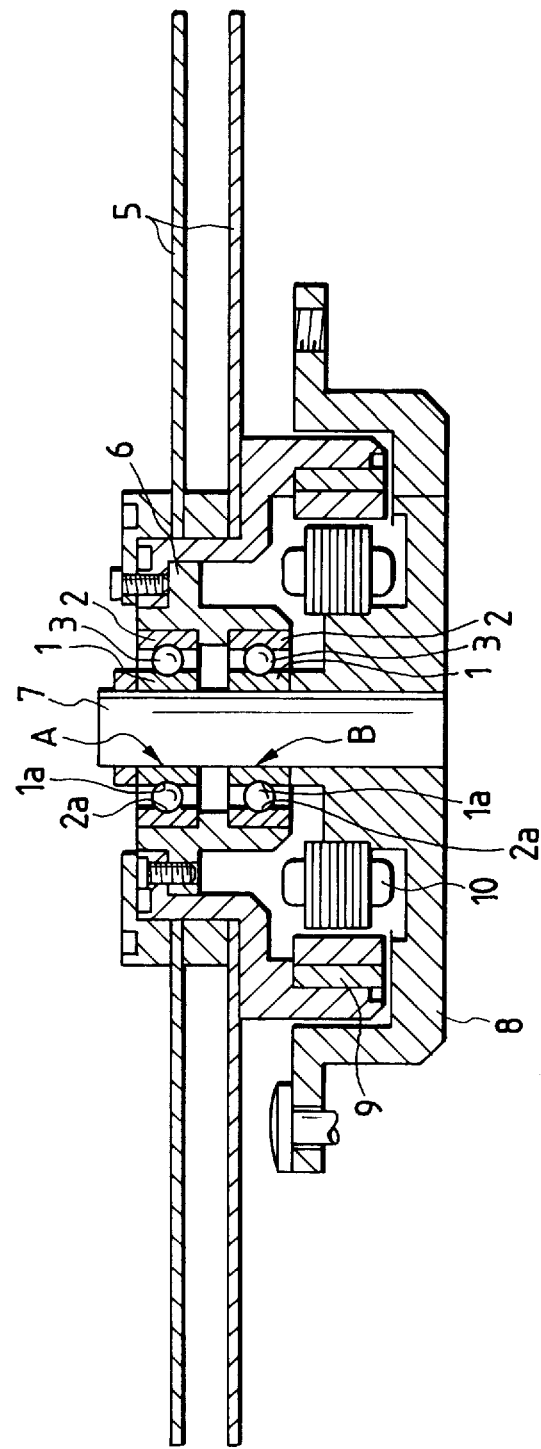
FIG. 2 is a sectional view showing an example of a spindle motor in a hard disk device equipped with bearings according to the present invention.

FIG. 2 is a sectional view showing the spindle motor. A cylindrical hub 6 which is a rotating body integrated with disks 5 is rotatably supported to a shaft member 7 through two rolling bearings A and B. The shaft member 7 is vertically fixed to a base 8 to thereby form a fixing side member. The direction of the shaft member 7 of the spindle motor is not limited to the vertical direction, and the shaft member 7 may be used horizontally.

The two rolling bearings A and B are ball bearings arranged in parallel at a predetermined distance in the axial direction of the shaft member 7. The outer races 2 of the rolling bearings are fixed to the inner circumferential surface of the hub 6 by loose fitting, or the like. The inner races 1 of the rolling bearings are fixed to the shaft member 7 by loose fitting, or the like. When loose fitting is employed, the vibration of the ball bearings caused by the passage of the rolling elements (balls 3) is cut off so that reduction of non-repeatable run-out of the spindle motor is improved. If necessary, the outer and inner races 2 and 1 may be fixed to the hub 6 and the shaft member 7 by using forcing, adhesion, welding, etc., in combination.

The raceway surfaces 1a and 2a of the inner and outer races 1 and 2 and the balls 3 as rolling elements are processed by a known method so that geometrical error and dimensional difference become as small as possible in order to improve rotational precision.

Further, in this embodiment, the number of balls is limited to a value equal to a number having, as many divisors, the numbers of error peaks in main low-frequency components of geometrical error of the raceway surfaces 1a and 2a of the inner and outer races 1 and 2.

Further, an annular rotor 9 is fixed to the inner circumferential surface of the lower end portion of the hub 6 so as to be concentric with the hub 6. Further, a stator 10 is arranged in the direction of the inner diameter of the rotor 9 at a predetermined distance so as to be concentric with the rotor 9 to thereby form a motor portion. The stator 10 is fixed to the base 8.

Incidentally, there is some case where the rotor 9 side is arranged in the inner circumferential side of the stator 10.

In the hard disk device having the aforementioned spindle motor, the raceway surfaces 1a and 2a of the inner and outer races 1 and 2 and the balls 3 are processed with high geometrical precision so that geometrical error and dimensional difference become as small as possible. Accordingly, the non-repeatable run-out of the disks 5 caused by the bearings is reduced. Furthermore, because the number of balls is limited as described above, the non-repeatable run-out caused by the bearings A and B per se is reduced more greatly. Accordingly, vibration given to the head at the time of reading is suppressed even in the case where the rotational speed of the hard disks 5 is increased. Accordingly, the hard disk device can be adapted for higher speed and higher density.

Assuming now that the present invention is applied to a spindle motor ball bearing for a 3.5-inch or 2.5-inch magnetic disk device, then a ball bearing having an inner diameter of $\phi$6 to $\phi$4 mm and an outer diameter of $\phi$15 mm to $\phi$8 mm is generally used in most cases. Accordingly, it is difficult to put 18 or more balls into the ball bearing in terms of space. Accordingly, a ball bearing in which the number of balls is limited to 12 is practically optimal. It is a matter of course that the number of balls may be possibly selected to be 16 or 18 by reducing the ball size more greatly.

Incidentally, the number of balls put into the conventional ball bearing used in spindle motor of this type is in a range of 6 to 10, that is, not larger than 10.

That is, the conventional ball bearing used in the spindle motor is generally designed on the basis of ISO 69X and 68X as the width series. The standard of the design in the width series is as follows.

(1) The P.C.D. (pitch circle diameter) of each rolling element is set to be near the sectional center {(outer diameter+ inner diameter)/2} of the bearing.
(2) The size (diameter) of the rolling element is selected to be in a range of 45 to 65% of the sectional width {(outer diameter—inner diameter)/2} of the bearing.

(3) The maximum number of rolling elements is set to be a number in which the distance between the centers of the rolling elements is about 50% of the P.C.D. circumference when the rolling elements are arranged on the circumference of the rolling element P.C.D., taking deformation of the bearing in assembling into account.

In a specific example based on the design standard, 695 widely used as a spindle motor ball bearing satisfies the all requirements of the conventional standard design as follows.

For an outer diameter of 13 mm and an inner diameter of 5 mm,

P.C.D.=9 mm
{(13+5)÷2=9 expresses the sectional center of the bearing}

Diameter of each rolling element: 2 mm
{(13−5)÷2=4 expresses the fact that the diameter of the rolling element of 2 mm is 50% (2/4=0.5 times) of the sectional width of the bearing}

The number of rolling elements: 8
{the length of the circumference of the rolling element P.C.D.: 9×π=28.274 mm, the distance between the centers of the rolling elements: 2×7=14, 14/28.274= 0.495 (∴ 49.5%) when eight rolling elements each having a diameter of 2 mm are arranged}

As described above, there is no basis of reducing the diameter of each rolling element to design the number of rolling elements to be larger than 10, for example, 12, in the standard design method. The design that the number of rolling elements is set to be 12, or the like, for a measure to reduce non-repeatable run-out is thought of to be a unique design based on the present invention.

Further, a ball bearing which is designed so that the outer diameter of the outer race is larger than that of the conventional outer race while the inner diameter of the inner race is not changed may be used in order to assemble large-diameter rolling elements which are easy to improve the machining accuracy of the rolling elements (balls).

When a ball bearing is designed so that such large-diameter balls are assembled in the ball bearing, there is a large practical effect because not only is it difficult to machine small balls per se highly accurately but also it is difficult to carry the small balls and to handle the same in assembling. To design the ball bearing so as to select the outer diameter of the outer race to be a special size without changing the inner diameter of the inner race is more excellent as a countermeasure to improve non-repeatable run-out from the point of view of reduction in cost because it is possible to use existing machining facilities as they are and it is easy to increase the number of balls to 12.

Further, because there is an attendant effect of increasing the thickness of the raceway surface, there is an excellent practical effect in reduction of deformation at the time of assembling, and so on. For example, a conventional ball bearing 695 widely used for a hard disk spindle motor has an inner diameter of 5 mmφ, an outer diameter of 13 mmφ and a width of 4 mm and uses a 1/16 inch (1.588 mmφ) ball diameter in the case where the number of balls is 10. If 12 rolling elements (balls) are to be put into the ball bearing without any change in inner and outer diameters, no ball but 1.2 mmφ-diameter balls can be put as mass-produced balls. Accordingly, there arises an advantage that 1/16 inch balls currently mass-produced can be used as they are, if, for example, the outer diameter of the outer race is designed to be 14 mmφ or 15 mmφ as a special size.

Further, in the case where it is difficult to apply the special size to the outer race because of limitation to the inner diameter of the inner race and the outer diameter of the outer race, rolling elements (balls) which are not mass-produced at present but is specially designed to have a diameter of 1.3 mmφ or 1.4 mmφ may be used to obtain a ball bearing having 12 rolling elements assembled therein.

As described above, the design that the number of balls is set to be 12, 16 or 18 according to the present invention has not been implemented in the conventional ball bearing for the aforementioned purpose. Accordingly, it is clear that the non-repeatable run-out of the ball bearing according to the present invention is reduced compared with that of the conventional hard disk spindle ball bearing.

When the number of rolling elements is set to be 12, or the like, the requirement (3) of the conventional standard design must be always satisfied in order to reduce the deformation of the bearing at the time of assembling. Further, for improvement of the deformation strength of the raceways of the bearing and the processing precision of the raceway surfaces at the time of assembling of the spindle motor, the inner and outer races are preferably set to be thick. The rolling element P.C.D. is preferably set to be near the sectional center of the bearing, and the diameter of each rolling element is preferably set to be small.

The another embodiment will be described below with reference to the drawings. This is the case where the invention is applied to a hybrid type dynamic pressure spindle motor of a hard disk device. Incidentally, parts the same as those in the one embodiment are referenced correspondingly.

Figure 3:
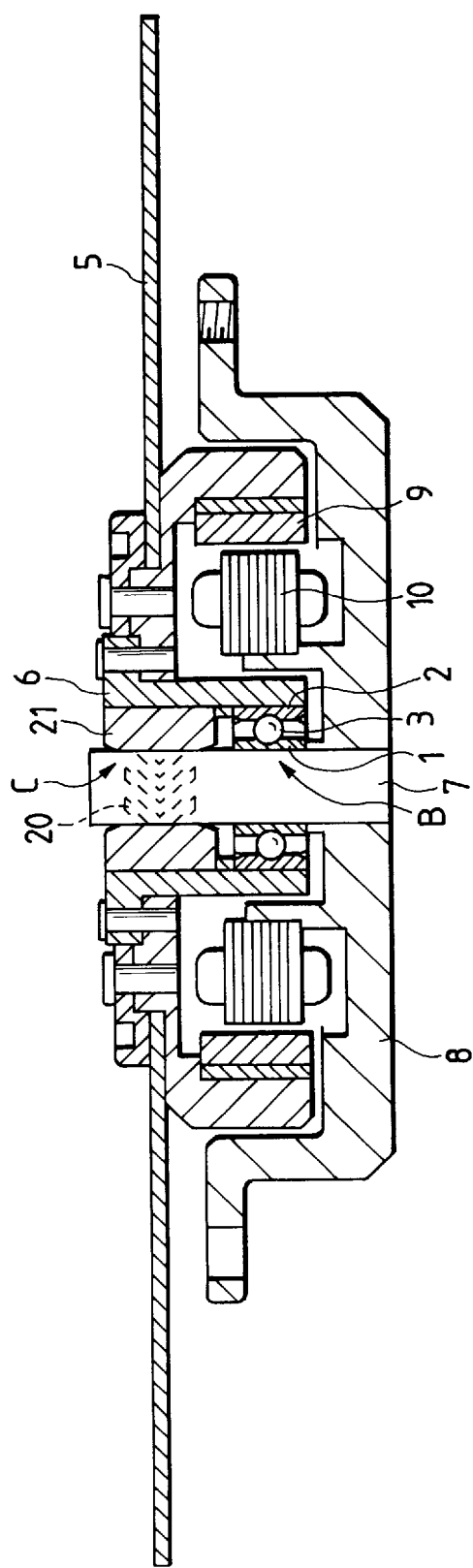
FIG. 3 is a sectional view showing another example of a spindle motor in a hard disk device equipped with bearings according to the present invention.
Figure 4:
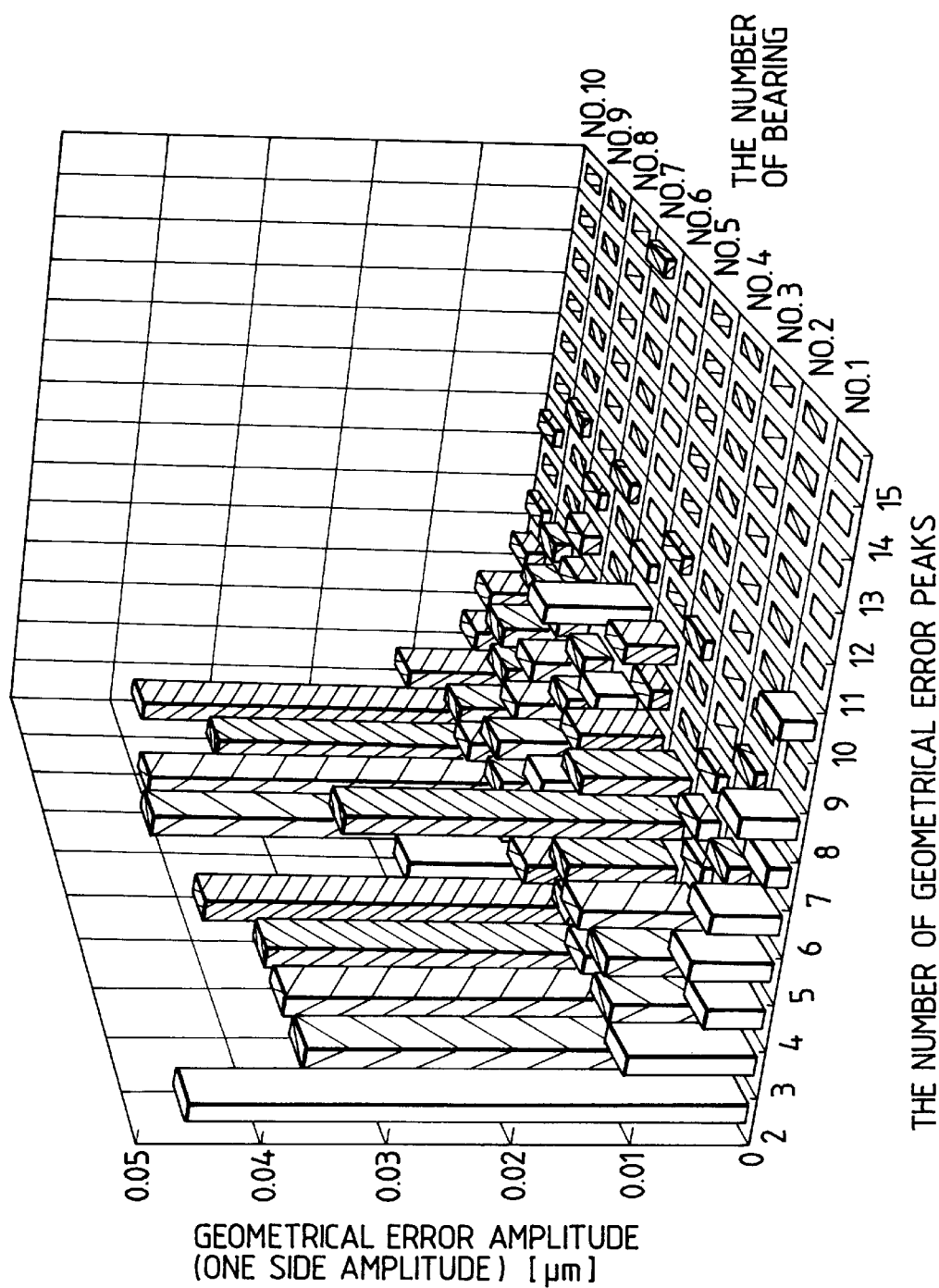
FIG. 4 is a view of error amplitudes in inner and outer raceway surfaces analyzed correspondingly to the number of peaks.

FIG. 3 is a sectional view showing the spindle motor. The basic configuration of the another embodiment is the same as the first embodiment, except that the spindle motor shown in FIG. 3 is a hybrid type spindle motor using a dynamic pressure bearing instead of one ball bearing (the upper ball bearing A in FIG. 2).

That is, a cylindrical hub 6 which is a rotating body integrated with disks 5 is rotatably supported to a shaft member 7 through a rolling bearing B and a dynamic pressure bearing C. The shaft member 7 is fixed to a base 8 so that the axis of the shaft member 7 is vertical. Thus, a fixing side member is formed.

The rolling bearing B is a ball bearing arranged in parallel at a predetermined distance in the axial direction of the shaft member 7. The outer race 2 of the rolling bearing is fixed to the inner circumferential surface of the hub 6 by loose fitting, or the like. The inner race 1 of the rolling bearing is fixed to the shaft member 7 by loose fitting, or the like. When loose fitting is made, the vibration of the ball bearing caused by the passage of the rolling elements (balls 3) is cut off so that the non-repeatable run-out of the spindle motor is improved. If necessary, the outer and inner races 2 and 1 may be fixed to the hub 6 and the shaft member 7 by using forcing, adhesion, welding, etc., in combination.

The raceway surfaces 1a and 2a of the inner and outer races 1 and 2 and the balls 3 as rolling elements are processed by a known method so that geometrical error and dimensional difference become as small as possible in order to improve rotational precision.

Further, in this embodiment, the number of balls is limited to a value equal to a number having, as many divisors, the numbers of error peaks in main low-frequency components of geometrical error of the raceway surfaces 1a and 2a of the inner and outer races 1 and 2.

On the other hand, the bearing for supporting the upper side of the shaft member 7 in FIG. 3 is a dynamic pressure bearing. A sleeve 21 as a dynamic pressure bearing member is fixed to the inner circumferential surface of the hub 6 by shrink-fit, or the like, so as to be concentric with the hub 6.

Grooves 20 for generating dynamic pressure are formed in the inner circumferential surface of the sleeve 21.

Although FIG. 3 shows the case where grooves 20 for generating dynamic pressure are provided in the inner circumferential surface of the sleeve 21, the grooves 20 may be provided in the outer circumferential surface of the shaft member 7 opposite to the inner circumferential surface of the sleeve 21 at a predetermined distance.

As described above, improvement of the rotational precision of the spindle motor is confirmed also in the case where a ball bearing according to the present invention is applied to one of the two bearings for supporting the shaft member 7.

The other configuration and functional effect are the same as in the first embodiment.

Although the second embodiment has shown the case where a ball bearing according to the present invention is arranged on the side near the base 8 and a dynamic pressure bearing is arranged on the side far from the base 8, the invention can be applied to the case where a ball bearing according to the present invention is arranged in the side far from the base 8 and a dynamic pressure bearing is arranged in the side near the base 8.

Hereinafter, an embodiment of the spindle apparatus according to the present invention will be described below with reference to the drawings. In this embodiment, parts the same as or equivalent to those in the aforementioned embodiments are referenced correspondingly.

Figure 13:
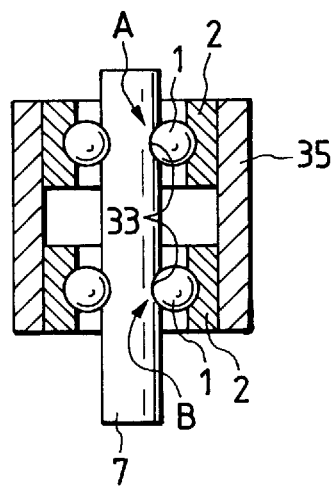
FIG. 13 is a view showing a spindle apparatus according to an embodiment of the present invention.

As shown in FIG. 13, the spindle apparatus in this embodiment is configured so that the sleeve 35 is rotatably supported to the shaft member 7 through two ball bearings A and B. The shaft member 7 constitutes a fixing member or a rotating body whereas the sleeve 35 constitutes a rotating body or a fixing member.

Two raceways 33 corresponding to the two bearings are provided in the outer circumference of the shaft member 7. The outer races 2 of the bearings are disposed coaxially with and outside the raceways 33. Twelve balls (rolling elements) 3 are interposed between each raceway 33 of the shaft member 7 and a corresponding outer race 2. Alternatively, the number of balls disposed in each of the bearings A and B may be 16 or 18.

The two outer races 2 are forced into or loosely fitted to the sleeve 35 and bonded or welded so as to be fixed to the sleeve 35.

In the spindle apparatus configured as described above, the number of balls put in each of the bearings A and B is limited to 12, or the like, to thereby suppress non-repeatable run-out caused by the processing error of the raceway surfaces of the bearings A and B and, accordingly, reduce the non-repeatable run-out of the spindle apparatus.

Because there is no inner race 1, the outer races 2 can be designed to be thick even in the case where the number of rolling elements is selected to be 12. Accordingly, the outer races 2 can be processed by cutting easily.

Next, the another embodiment of the spindle apparatus according to the present invention will be described below with reference to the drawings. In this embodiment, parts the same as or equivalent to those in the aforementioned embodiments are referenced correspondingly.

The spindle apparatus in this embodiment is an example applied to a spindle motor for a magnetic disk.

Figure 14:
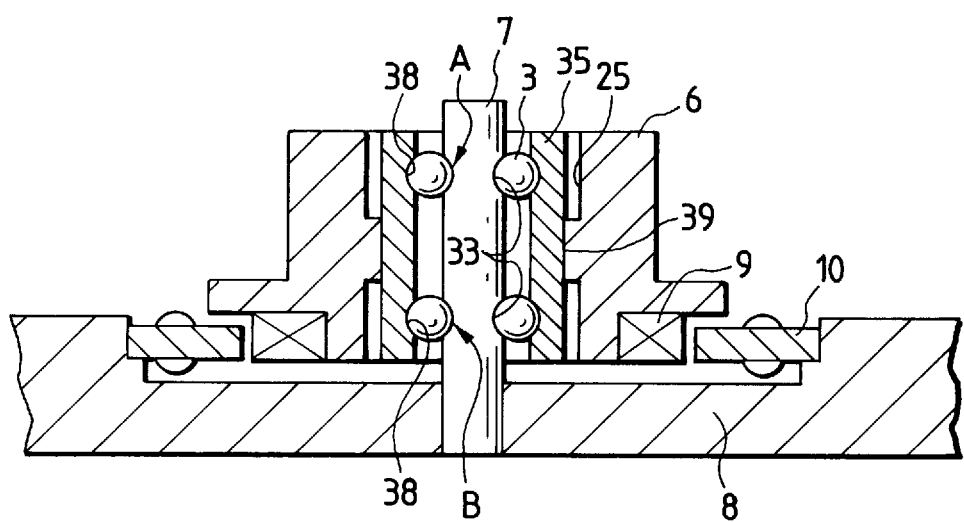
FIG. 14 is a view showing a spindle apparatus according to an embodiment of the present invention.
Figure 15:
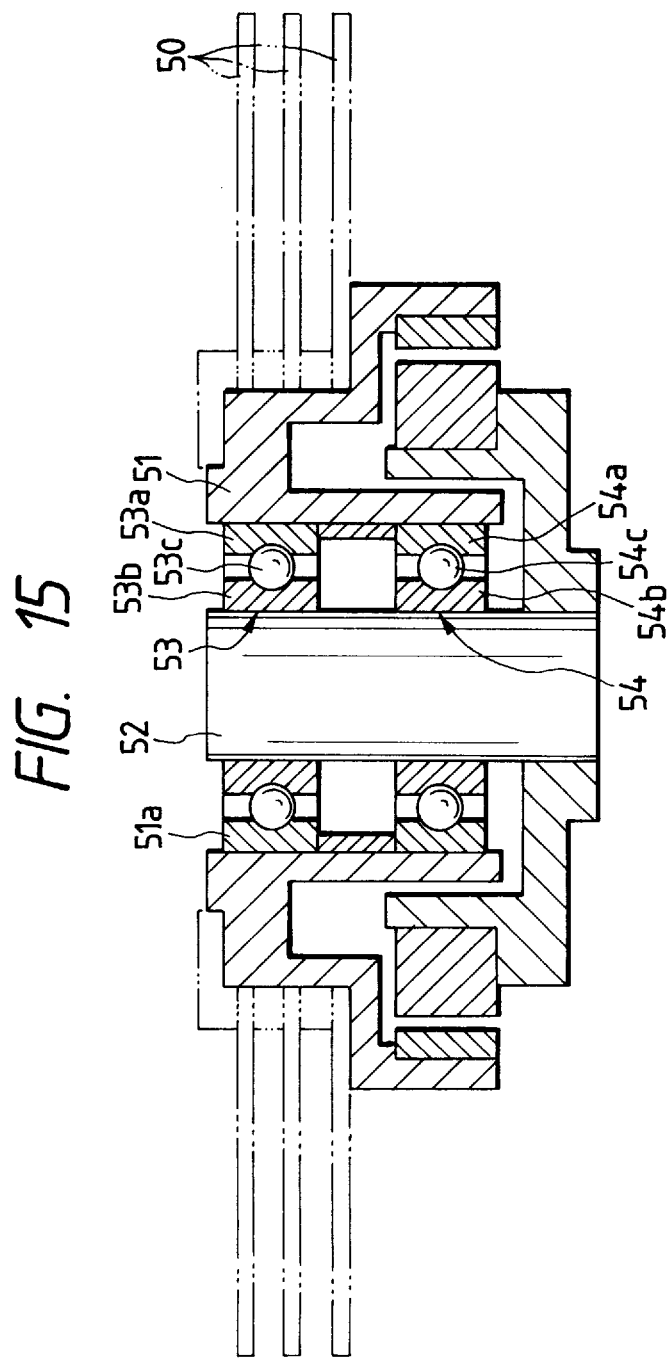
FIG. 15 is a view for explaining a conventional spindle apparatus.
Figure 16:
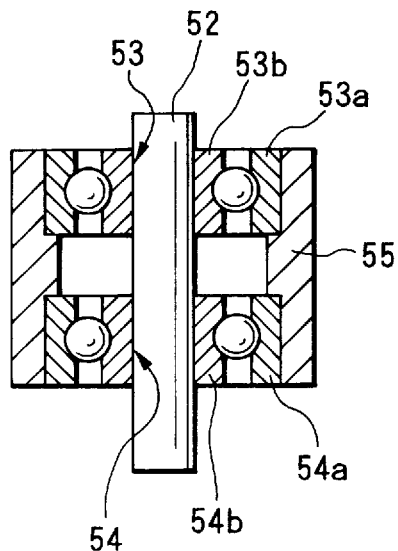
FIG. 16 is a view for explaining the case where the conventional spindle apparatus is provided as a unit system.

As shown in FIG. 14, in the spindle apparatus, the shaft member 7 and the sleeve 35 are disposed coaxially with each other. Two inside raceways 33 are provided directly in the outer circumferential surface of the shaft member 7. Two outside raceways 38 are provided directly in the inner circumferential surface of the sleeve 35. Balls 3, as rolling elements, are disposed between the shaft member 7 and the sleeve 35.

That is, the inner and outer races 1 and 2 of the two bearings are omitted so that the balls (rolling elements) 3 are interposed directly between the shaft member 7 and the sleeve 35.

In this spindle apparatus, rolling elements (balls) 3 each having a large size increased by the size of the outer race 2 can be used. Assuming now that the size of each ball 3 is not changed, then the outer diameter of the sleeve 35 can be designed to be small, that is, the outer diameter of the spindle apparatus can be designed to be small. In the case where neither the size of each ball 3 nor the size of the sleeve 35 is changed, the diameter of the shaft member 7 can be designed to be large so that the bending stiffness of the spindle apparatus can be set to be high.

Here, in this embodiment, the distance between two raceways 33 provided in the shaft member 7 is set to be slightly different from the distance between two raceways 38 provided in the sleeve 35 to thereby give preload to the balls 3 of the two ball bearings A and B to prevent the saccadic movement of the bearings.

Further, the number of balls disposed between two raceway surfaces 33 and 38 opposite to each other, that is, the number of balls put in each bearing is specified to be 12, 16 or 18 to thereby reduce non-repeatable run-out caused by the processing error of the raceways 33 and 38 provided in the shaft member 7 and the sleeve 35, respectively. Accordingly, vibration of the non-repeatable run-out of the spindle apparatus is reduced.

As shown in FIG. 14, the shaft member 7 is attached to the base 8 to which the stator 10 is fixed, and the hub 6 to which the rotor 9 is fixed and on which disks (not shown) are mounted is attached to the outer circumference of the sleeve 35. Thus, a spindle motor is assembled.

The hub 6 has a through-hole 25 with a larger diameter than the outer diameter of the sleeve 35. An angular projection 39 is disposed in the axially intermediate portion of the through-hole 25 so as to be formed along the circumferential direction and the outer circumference of the sleeve 35 is fixed to the projection 39. The inner diameter surface of the projection 39 are loosely fitted to or forced into the sleeve 35 and bonded and welded so as to be fixed.

In this case, the position of the rolling elements (the position where the raceways are provided) is avoided as the axial position of the sleeve 35 fixed to the projection 39 to thereby prevent the raceways from being deformed when the sleeve 35 is assembled with the hub 6.

The number of projection 39 for attaching the sleeve 35 to the hub 6 is not always limited to one. A plurality of projections 39 may be provided, or the projection 39 may be provided in the sleeve 35 side.

When this spindle apparatus is used, the spindle motor can be assembled by a simple operation of attaching the shaft member 7 to the base 8 and attaching the hub 6 to the outer circumference of the sleeve 35. Accordingly, it is easy to assemble the motor.

Further, because the inside raceways are provided directly on the shaft member 7, the pitch circle of the balls (rolling elements) 3 can be designed to be small. Accordingly, torque is reduced. Furthermore, when the number of balls is specified, the bearings are hardly affected by waviness caused by the processing error of the raceways. Accordingly, it is easy to dispose the magnetic head in position with high precision.

Next, a first embodiment of the spindle apparatus according to the fourth aspect of the present invention will be described below with reference to the drawings. In this embodiment, parts the same as those in the aforementioned embodiments are referenced correspondingly.

Figure 5:
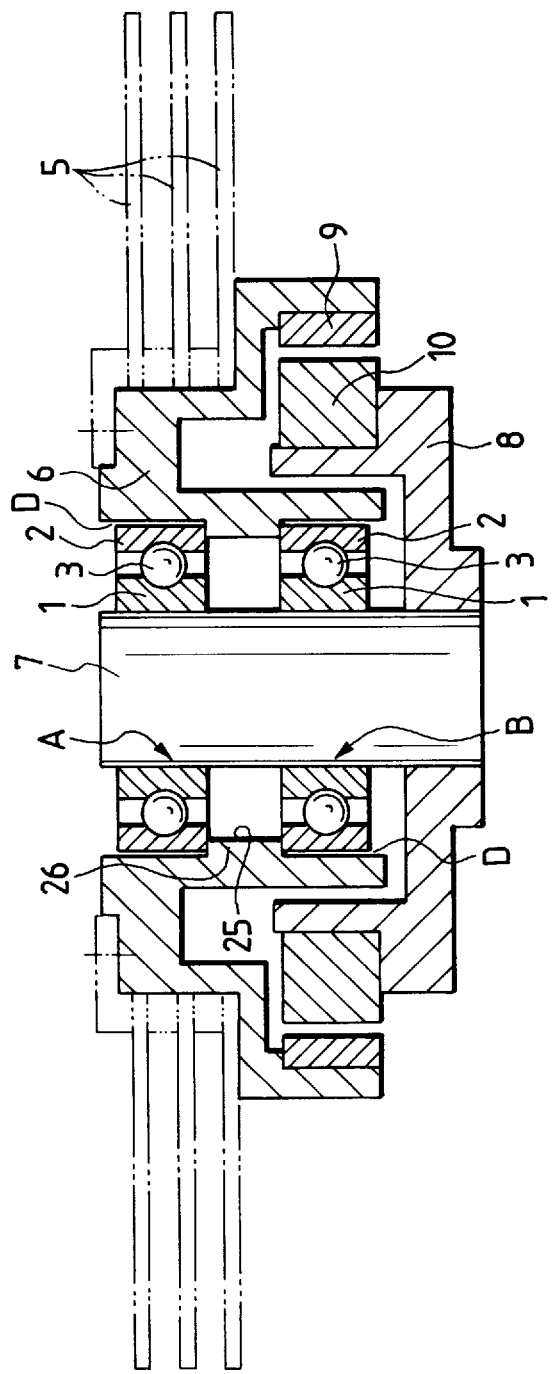
FIG. 5 is a view showing a spindle apparatus according to an embodiment of the present invention.

FIG. 5 is a sectional view showing a spindle apparatus. A cylindrical through-hole 25 is formed in the center of a hub 6 which is a rotating body. A shaft member 7 which is a fixing member is relatively inserted into the through-hole 25. Two support bearings A and B are interposed between the through-hole 25 and the outer circumference of the shaft member 7 so that the hub 6 is rotatably supported to the shaft member 7. One end of the shaft member 7 is fixed to a base 8. In addition, a motor portion (constituted by a rotor 9, and a stator 10) is mounted on this spindle apparatus.

Further, a plurality of disks 5 are mounted on the hub 6. In this embodiment, servo signals are written in the disks 5 individually respectively.

The two support bearings A and B are ball bearings arranged in parallel at a predetermined distance in the direction of the axis of the shaft member 7. The outer races 2 of the bearings A and B are attached to the inner circumferential surface of the hub 6 and the inner races 1 of the bearings A and B are attached to the shaft member 7.

The inner races 1 are forced into the outer circumference of the shaft member 7 by tight fitting and then bonded with an adhesive to the outer circumference of the shaft member 7 so that preload is not lost by external impact given at the time of transportation, or the like. That is, the inner races 1 are fixed to the shaft member 7 so as to apply preload to the ball bearings.

On the other hand, the two outer races 2 are loosely fitted into the through-hole 25 of the hub 6. In this occasion, an annular projection 26 along the circumferential direction is provided in the through-hole 25 of the hub 6 to thereby form a step portion. The respective end surfaces of the two outer races 2 abut on the step portion so that the two outer races 2 are positioned. At the same time, preload is given to the bearings A and B so that the saccadic movement of the bearings A and B is eliminated.

The reason why the outer races 2 are loosely fitted and the inner races 1 are tightly fitted is that the hub 6 formed of an aluminum alloy for the purpose of reduction of weight, or the like, and processed by cutting is more or less inferior in processing precision whereas the outer circumferential surface of the shaft member 7 is processed with high precision by grinding so that the influence of the deformation of the raceways is less when the inner races 1 are fixed to the shaft member 7.

Further, as each of the ball bearings A and B, used is a bearing in which the number of balls (rolling elements) 3 interposed between the inner and outer races 1 and 2 is 12, 16 or 18. By using the ball bearings A and B having the specific number of balls in such a manner, the influence of non-repeatable run-out caused by raceway surface geometrical error of the inner and outer races 1 and 2 of the ball bearings A and B can be reduced in the aforementioned manner. The non-repeatable run-out of each ball bearing and, accordingly, the non-repeatable run-out of the spindle apparatus as a whole can be reduced.

The raceway surfaces of the inner and outer races 1 and 2 and the balls 3, which are rolling elements, are processed by a known method so that geometrical error and dimensional difference become as small as possible in order to improve rotational precision.

The loose fitting portion D is filled with a fluid or lubricant such as air, oil, grease, etc.

If the loose fitting portion D between the outer races 2 and the through-hole 25 of the hub 6 is filled in advance with a lubricant such as oil, etc. constituting a cushioning member, the vibration transmitted to the hub 6 and, accordingly, to the disks 5 mounted on the hub 6 through the outer races 2 of the ball bearings A and B is damped by the lubricant. Accordingly, the non-repeatable run-out of the hub 6 at the time of rotation of the hub 6 (the disks 5) can be reduced more greatly even in the case where the outer races 2 are loosely fitted to the hub 6. Further, the loose fitting portion D filled with the lubricant in such a manner has the same function as the loose fitting portion D having a squeeze film damper interposed therein. Accordingly, there is also an effect that the center of the hub 6 is hardly displaced relative to the shaft member 7 even in the case where an impact load acts from the outside at the time of transportation, or the like. The fluid constituting the cushioning member is not limited to a lubricant such as oil, etc. and may be air. Fluids such as air, oil, grease, etc. are selected in use suitably.

Because of the apparatus configuration in which the hub 6 serves as a rotating body so that the outer races 2 rotate, grease having a viscosity higher than oil is preferable to use as the lubricant in that the scatter of the lubricant is eliminated at the time of the operation of the spindle to thereby elongate the life of the damping effect of the lubricant.

In this occasion, use of grease having a consistency not smaller than 2, preferably not smaller than 4, is more desirable in that the scatter of grease caused by centrifugal force is reduced.

Of course, in the case of a spindle apparatus in which the hub 6 serves as a fixing member and the shaft member 7 serves as a rotating body so that disks 5 are mounted on the shaft member 7, the outer races 2 never rotate. Accordingly, there is no necessity of taking into account the scatter of the lubricant caused by centrifugal force.

Although the aforementioned embodiment has shown the case where the inner races 1 are forced into the shaft member 7 by tight fitting and bonded with an adhesive to the shaft member 7, the inner races 1 may be fixed by spot welding using a laser after the inner races 1 are forced or loosely fitted onto the shaft member 7.

In the case where the inner races 1 are loosely fitted and spot-welded to the bearings, the deformation of the raceway surfaces of the inner races 1 caused by forcing can be avoided. Accordingly, the non-repeatable run-out of the bearings caused by mounting can be reduced.

In the case where the inner races 1 are fixed by laser spot welding instead of bonding with an adhesive as described above, advantages can be obtained in that not only the deformation of the raceways of the bearings caused by uneven bonding is prevented but also generation of out-gas is prevented.

In the case where the inner races 1 are fixed by bonding, a time is required for hardening. In the case where the inner races 1 are fixed by welding, however, no time is required for hardening. Accordingly, the time required for fixing is shortened. Further, because the change with the passage of time after fixing is little compared with the case of bonding with an adhesive, the life of the spindle is elongated.

Further, an annular rotor 9 is fixed to the inner circumferential surface of the lower end portion of the hub 6 coaxially with the hub 6. Further, a stator 10 is arranged inside the rotor 9 at a predetermined gap so as to be concentric with the rotor 9. The stator 10 is fixed to the base 8.

In the magnetic disk device having such a spindle apparatus, the raceway surfaces of the inner and outer races 1 and 2 and the balls 3 are processed with high geometrical precision so that geometrical error and dimensional difference become as small as possible. Accordingly, the non-repeatable run-out of the disks 5 caused by the bearings A and B is reduced. Furthermore, because the number of balls is limited as described above, the non-repeatable run-out caused by the bearings A and B per se is reduced more greatly. Furthermore, non-repeatable run-out of the spindle apparatus per se caused by the mounting of the bearings is suppressed. Accordingly, vibration given to the head at the time of reading is suppressed to a small value even in the case where the rotational speed of the disks 5 is increased correspondingly. Accordingly, the magnetic disk device can be adapted for higher speed and higher density.

Further, in this embodiment, the plurality of disks 5 are mounted on the hub 6 in the spindle apparatus but servo signals are recorded on the disks 5 respectively. Accordingly, even in the case where the centers of the disks 5 are slightly displaced by impact given at the time of carrying of the spindle apparatus, etc., the respective disks 5 can be accessed securely.

Figure 6:
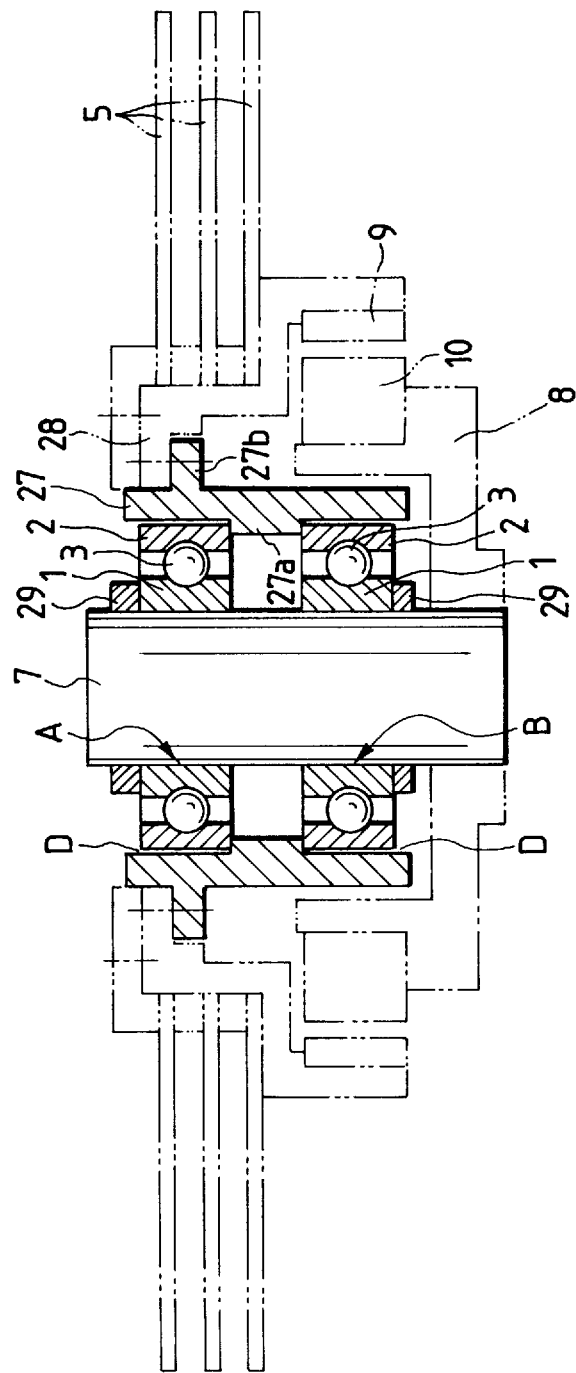
FIG. 6 is a view showing a spindle apparatus according to an embodiment of the present invention.

Here, in the case where the shape of the disk mount portion on the outer circumference of the hub 6, the shape of the rotor 9 of the motor, and the like, vary correspondingly to the machine type assembled with the spindle apparatus correspondingly to the number of disks to be mounted, the spindle apparatus can be provided in advance as a unit system having the configuration shown in FIG. 6.

That is, the hub 6 of the spindle motor is constituted by a sleeve 27 for assembling the ball bearings, and a hub body 28 attached to the outer circumference of the sleeve 27 for mounting the disks 5. An inward flange 27a is provided on the inner circumferential surface of the sleeve 27 so as to abut on the outer races 2 of the bearings in the axially center portion whereas an outward flange 27b for attaching the hub body 28 is provided on the outer circumferential surface of the sleeve 27. In this occasion, the sleeve 27 constitutes a rotating body.

Also the base 8 attached to one end portion of the shaft member 7 constituting a fixing member may be changed correspondingly to the motor type.

When the spindle apparatus is configured as described above, the spindle apparatus around the bearings is integrated. Accordingly, not only a small spindle apparatus which is little in non-repeatable run-out can be used in common to various disk devices but also such a spindle apparatus can be consistently produced by a bearing maker.

Accordingly, a spindle apparatus which is excellent in mass production and which is a main portion of a spindle motor, is provided as a unit system to perform production of bearings and assembling thereof. There arises an advantage that precision in non-repeatable run-out of the spindle apparatus provided as a unit system can be guaranteed.

Further, because the conventional bonding process is eliminated at the time of assembling of the motor, assembling in a motor maker (electrical appliances maker) is made very easy.

Here, in the spindle apparatus in this embodiment, the hub body 28 is attached to the outer circumference of the sleeve 27 by loose fitting and fixed to the outward flange of the outer circumference of the sleeve 27 by thread engagement so that the deformation of the outer races 2, or the like, of the ball bearings A and B caused by the attachment of the hub body 28 is avoided.

When the spindle motor having the aforementioned spindle apparatus is applied to the magnetic disks 5 using MR (magnetic reluctance) and GMR (great magnetic reluctance) heads, the track pitch can be narrowed up to an extreme value not larger than the order of $\mu$m. Accordingly, the recording surface density of the magnetic disk device can be improved remarkably.

Here, in the embodiment shown in FIG. 6, the inner races 1 are not directly but indirectly fixed to the shaft member 7 as follows. In order to fix the inner races 1 in the axial direction in the condition in which the inner races 1 are subjected to a preload, bushes 29 are made to abut on end surfaces of the two inner races 1 from the axial direction, and the bushes 29 are fixed to the shaft member 7 by laser welding or bonding to thereby fix the inner races 1 to the shaft member 7 indirectly.

In this manner, not only the outer races 2 can be loosely fitted to the sleeve 27 but also the inner races 1 can be loosely fitted to the shaft member 7. Accordingly, the deformation of the inner and outer races 2 and 1 of the bearings caused by the fitting is avoided, so that reduction of non-repeatable run-out of the spindle apparatus is improved more greatly.

Further, because the bushes 29 are fixed to the shaft member 7 to thereby fix the inner races 1 to the shaft member 7, there arises also an advantage that the deformation of the raceway surfaces of the inner races 1 caused by the direct fitting of the inner races 1 to the shaft member 7 is avoided. In addition, because the bushes 29 abut on the end surfaces of the inner races 1 from the axial direction, the raceway surfaces of the inner races 1 are never deformed by the abutting of the bushes 29.

In this occasion, if welding is used instead of bonding with an adhesive agent, there arises also an advantage that not only assembling of the spindle apparatus is completed in a short time but also the fact that there is no out-gas trouble leads to the improvement of the working atmosphere.

Instead of welding of the bushes 29, the inner races 1 may be brazed to the shaft member 7 by using a low-melting metal.

Further, elastic materials such as O-rings, spring members, etc. may be interposed between the bushes 29 and the inner races 1 to absorb the vibration in the axial direction.

The aforementioned fixing methods and the aforementioned methods of filling the loose fitting portion with a lubricant to thereby damp the vibration transmitted from the bearings A and B to the hub 6 etc. can be applied also to spindle apparatuses which will be described below. The same operation and same effect as those described above can be obtained.

The second embodiment of the spindle apparatus according to the fourth aspect of the present invention will be described below with reference to the drawings. In this embodiment, parts the same as or equivalent to those in the foregoing embodiments are referenced correspondingly.

Figure 7:
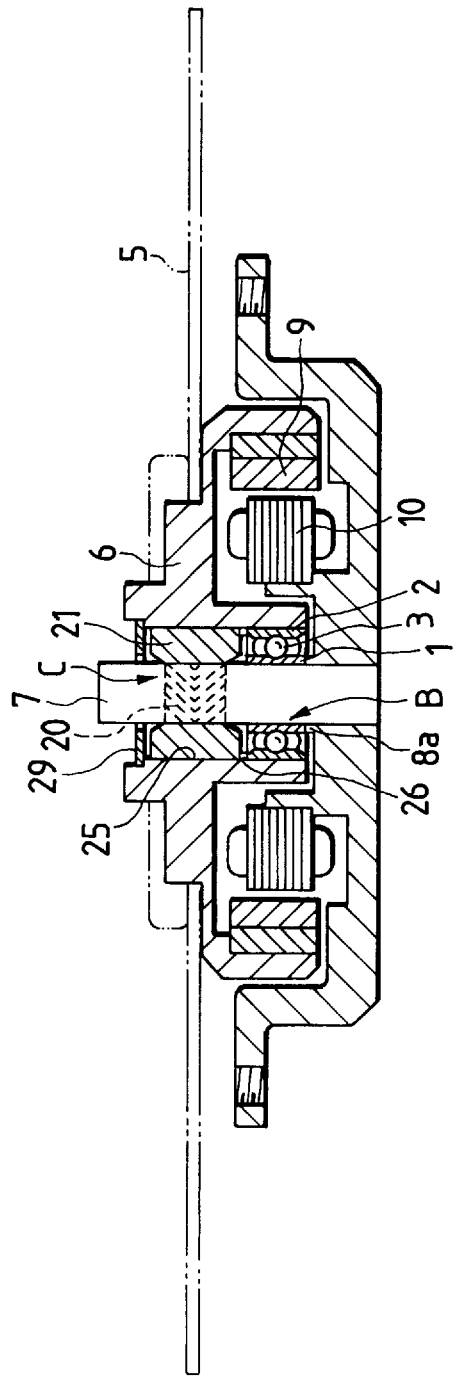
FIG. 7 is a view showing a spindle apparatus according to an embodiment of the present invention.

As shown in FIG. 7, the basic configuration of the spindle apparatus in this embodiment is the same as in the first embodiment, except that a radial dynamic pressure bearing C is used as one support bearing.

That is, the ball bearing B in this embodiment has the same configuration as the ball bearing in the first embodiment and the number of balls is 12, 16 or 18. In this embodiment, the outer race 2 is loosely fitted to the hub 6, and also the inner race 1 is loosely fitted to the shaft member 7. In this occasion, one end surface of the inner race 1 is made to abut on a step portion 8a provided in the base 8 and one end surface of the outer race 2 is made to abut on the annular projection 26 provided in the through-hole 25 to thereby give preload to the ball bearing B to eliminate the saccadic movement of the ball bearing.

On the other hand, one radial dynamic pressure bearing C has a groove 20 provided in the inner circumferential surface of the sleeve 21 for generating dynamic pressure. A cover plate 29 for preventing the lubricant from scattering is attached to the through-hole 25 of the hub 6 in the other end portion side of the shaft member 7. Alternatively, the dynamic-pressure-generating grooves may be provided in the outer circumferential surface of the shaft member 7.

The other basic configuration is the same as in the first embodiment.

In the spindle apparatus, when the number of balls is specified, the non-repeatable run-out of a single ball bearing is suppressed to a small value. Further, because only one ball bearing B is used only by one as the one support bearing A, and the dynamic pressure bearing C substantially free from non-repeatable run-out is used as the other support bearing A, it is possible to avoid the bad influence of error in assembling of bearings in the case where the spindle apparatus is supported by two ball bearings. Furthermore, because the inner and outer races 1 and 2 are loosely fitted, there is no bad influence of the deformation of the raceway caused by bonding. Accordingly, a spindle apparatus in which non-repeatable run-out is very small is obtained.

Further, the center of gravity of the disk 5 is designed to be located in the position of arrangement of the dynamic pressure bearing C. Accordingly, the influence of the vibration of the ball bearing on the disk 5 is suppressed to a small value so that performance as high as that of the dynamic pressure bearing can be obtained with respect to the non-repeatable run-out of the disk 5 mounted on the hub 6 of the spindle apparatus.

The other configuration, operation and effect are the same as in the first embodiment.

A third embodiment of the spindle apparatus according to the other aspect of the present invention will be described below with reference to the drawings. In this third embodiment, parts the same as or equivalent to those in the foregoing embodiments are referenced correspondingly.

Figure 8:
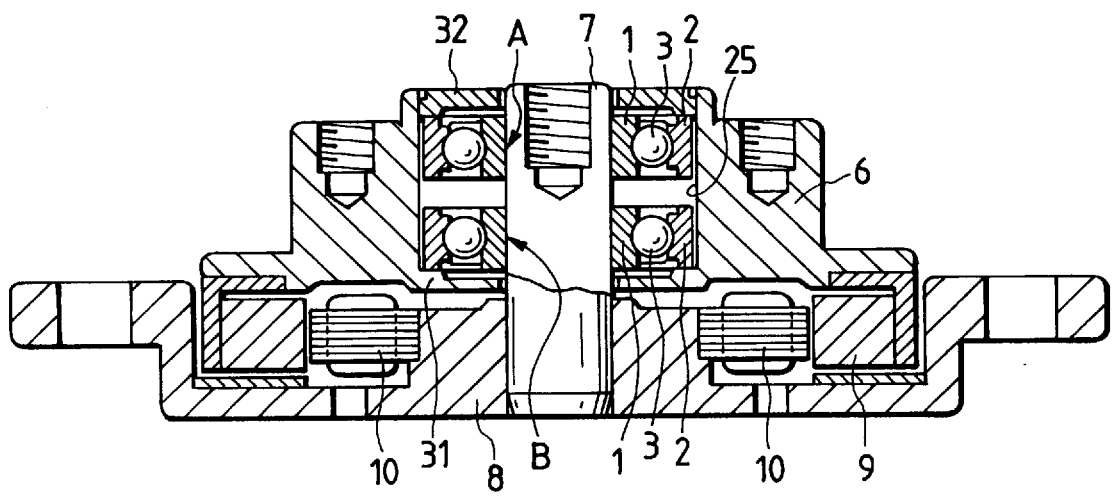
FIG. 8 is a view showing a spindle apparatus according to an embodiment of the present invention.

As shown in FIG. 8, this embodiment is designed in the same manner as the first embodiment so that the hub 6 on which a plurality of disks 5 not shown are mounted is rotatably supported to the shaft member 7, which is a fixing member, through two ball bearings A and B.

The inner races 1 of the two ball bearings A and B are fixed to the outer circumference of the shaft member 7 by an adhesive agent. On the other hand, the outer races 2 are loosely fitted into the through-hole 25 of the hub 6.

In this case, an inward flange 31 is provided in the base 8-side end portion of the through-hole 25 provided in the hub 6. A step is formed by the inward flange 31. One end surface of the outer race 2 of one bearing B is made to abut on the step to thereby give preload to the bearing B. Further, in the condition where preload is applied to the outer race 2 of the other bearing A, a ring-like pressure member 32 is attached from the other opening portion of the through-hole 25 to thereby give preload to the two bearings A and B.

By the thus given preload, the outer races 2 loosely fitted to the hub 6 can be prevented from vibrating even in the case where the outer races 2 are loosely fitted to the hub 6. Further, because the preload is given in the axial direction, the raceway surfaces of the outer races 2 are never deformed by the given preload.

Incidentally, a spacer for positioning the two inner races 1 may be interposed between the two inner races 1. Or a projection portion instead of the spacer may be provided on the shaft member 7.

The other configuration, operation and effect are the same as those in the aforementioned embodiments.

When the number of balls in each of the ball bearings A and B is selected to be 12, 16 or 18, the ball bearing A or B is hardly affected by waviness caused by processing error of the raceway and, accordingly, the non-repeatable run-out of the spindle apparatus can be reduced correspondingly. The number of balls in each of the bearings A and B provided in the spindle apparatus in this embodiment is, however, not always limited to the aforementioned number. As described above, even in the case where the bearings are assembled simply, the effect of reducing the non-repeatable run-out of the spindle apparatus can be obtained.

A fourth embodiment of the spindle apparatus according to the fourth aspect of the present invention will be described below with reference to the drawings. In this embodiment, parts the same as or equivalent to those in the foregoing embodiments are referenced correspondingly.

Figure 9:
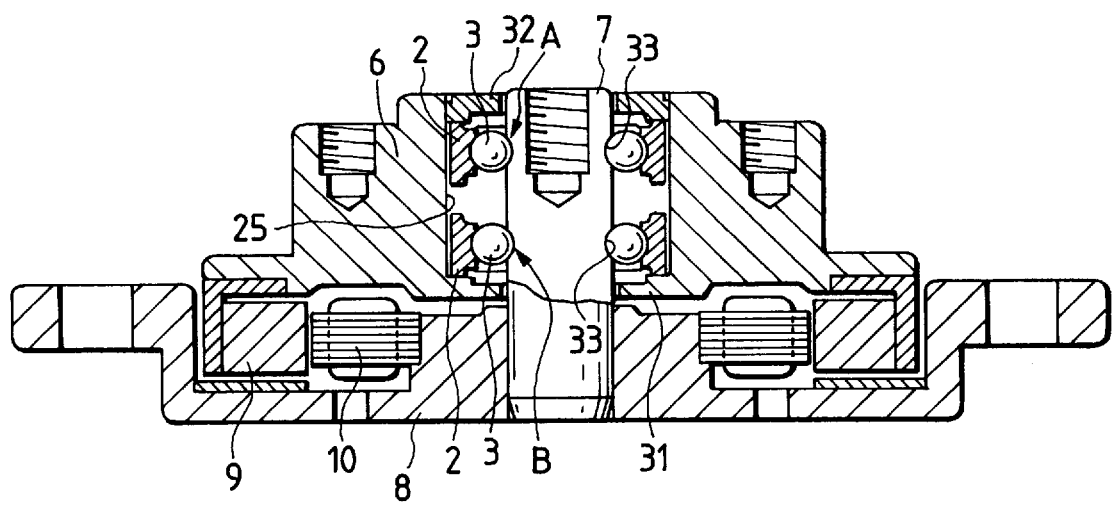
FIG. 9 is a view showing a spindle apparatus according to an embodiment of the present invention.

As shown in FIG. 9, the basic configuration of the spindle apparatus in this embodiment is the same as that of the spindle apparatus in the third embodiment, except that corresponding two raceway surfaces 33 are provided directly on the outer circumference of the shaft member 7 without providing any inner race 1.

The other configuration, operation and effect are the same as those of the spindle apparatus in the third embodiment.

The spindle apparatus shown in this embodiment is an example in which it is assumed that the spindle apparatus including bearings and a hub 6 and further including a motor portion is assembled as a unit structure in one place such as a bearing maker, or the like. In this manner, bearings and peripheries thereof can be integrated so that the spindle apparatus having the aforementioned configuration can be produced by a bearing maker, or the like. The fact that the spindle apparatus can be produced in one place in this manner brings about a merit that not only the spindle apparatus is excellent in mass productivity but also precision in the non-repeatable run-out of the spindle apparatus can be guaranteed as such a unit structure.

In assembling a motor, the conventional process of bonding the bearing portion is not required, and assembly of the spindle apparatus having the aforementioned configuration has been already completed. Accordingly, the motor can be assembled very easily by a disk device maker.

Because the spindle apparatus in this embodiment has no inner race 1 and has raceways 33 provided directly on the shaft member 7, not only the inner raceways 33 can be processed with high precision but also the number of parts in the spindle apparatus is reduced so that the cost of production is reduced.

Further, because the inner raceways 33 are provided directly on the shaft member 7, not only the pitch circle in each of balls (rolling elements) 3 in the ball bearings is reduced to thereby reduce the torque of the bearings but also the external size of the spindle apparatus can be reduced correspondingly to the space of the inner races 1 even in the case where it is assumed that bearings each having the same number of balls 3 of the same size put therein are used.

Next, a fifth embodiment of the spindle apparatus according to the fourth aspect of the present invention will be described below with reference to the drawings. In this fifth embodiment, parts the same as or equivalent to those in the aforementioned embodiments are referenced correspondingly.

Figure 10:
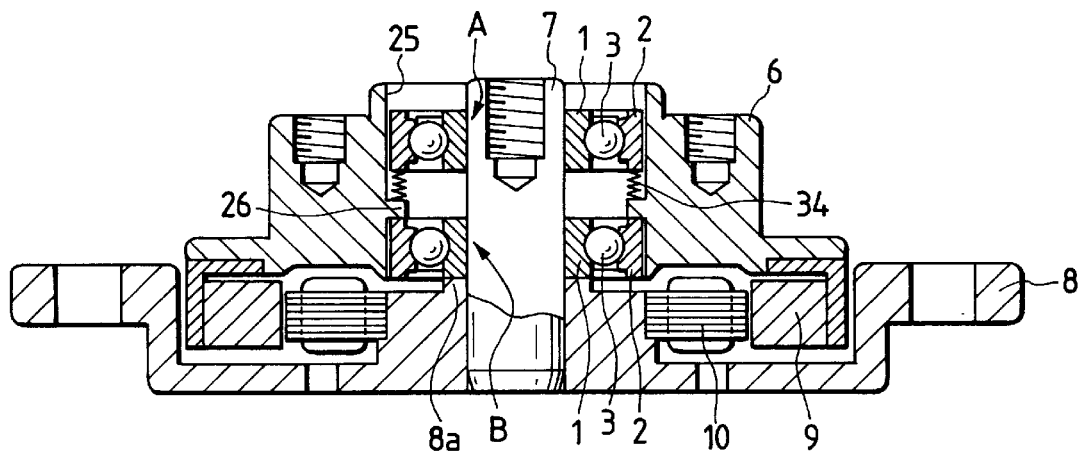
FIG. 10 is a view showing a spindle apparatus according to an embodiment of the present invention.

As shown in FIG. 10, the basic configuration of the spindle apparatus in this embodiment is the same as that of the spindle apparatus in each of the aforementioned embodiments. The hub 6 is supported to the shaft member 7 through two ball bearings A and B.

In this embodiment, the base 8 has an annular step portion 8a which is provided in advance in an end portion (upper side in FIG. 10) of a hole for mounting the shaft member 7 so that the step portion 8a faces the bearing side. An end portion of the inner race of one bearing B is made to abut on the step portion 8a for positioning the bearing B. After the inner races 1 of the two ball bearings A and B are forced into or loosely fitted to the shaft member 7, the inner races 1 are bonded or welded to the shaft member 7 so as to be fixed.

The outer races 2 of the two ball bearings A and B are loosely fitted into the through-hole 25.

An annular projection 26 designed to abut on the outer race 2 of one ball bearing B is provided in the axially intermediate position of the through-hole 25 of the hub 6 so that not only the outer race 2 of one ball bearing B is located in position but also preload is given to the ball bearing B.

A spring member 34 formed of a flat spring, or the like, is interposed between the projection 26 provided in the through-hole 25 and the outer race 2 of the other ball bearing A. In this manner, preload is given to the other ball bearing A in a reverse direction with respect to preload given to one ball bearing B. As the spring member 34, besides the flat spring, a coiled spring, etc. may be used.

By this preload, not only the saccadic movement of the two ball bearings A and B is eliminated but also the saccadic movement between the outer races 2 and the hub 6 caused by the loose fitting is suppressed.

In addition, a spacer may be provided between the inner races 1 of the two bearings A and B so as to perform positioning of the two inner races 1, especially the inner race 1 of the upper bearing A in FIG. 10 to thereby improve the positioning precision.

The other configuration, operation and effect are the same as those of each of the aforementioned spindle apparatuses.

A sixth embodiment of the spindle apparatus according to the fourth aspect of the present invention will be described below with reference to the drawings. In this sixth embodiment, parts the same as or equivalent to those in the aforementioned embodiments are referenced correspondingly.

Figure 11:
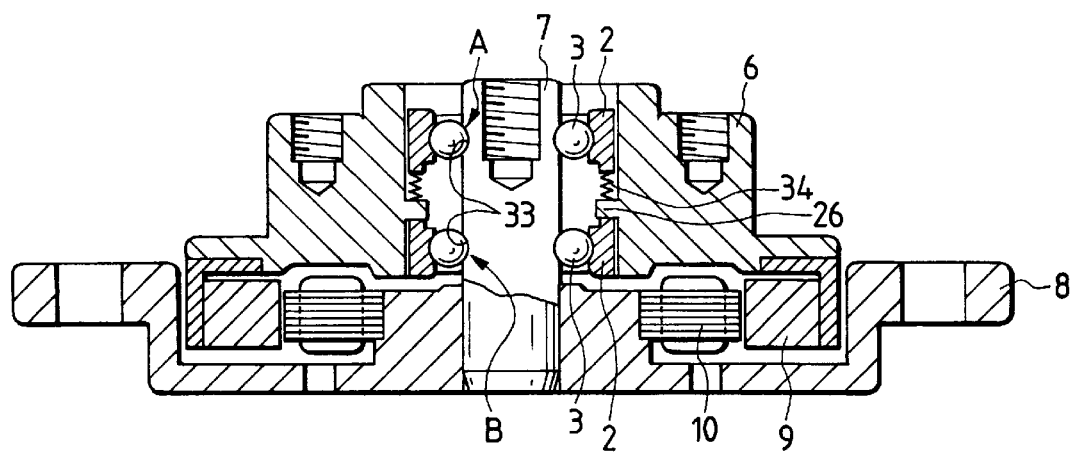
FIG. 11 is a view showing a spindle apparatus according to an embodiment of the present invention.

As shown in FIG. 11, the basic configuration of the spindle apparatus in this embodiment is the same as that of the spindle apparatus in the fifth embodiment, except that the inner races 1 of the bearings are omitted and that two raceways 33 are provided in the shaft member 7 instead.

The other configuration and operation are the same as those of the spindle apparatus in the sixth embodiment.

Here, in this embodiment, the spindle apparatus is an example in which it is assumed that the spindle apparatus including bearings and a hub 6 and further including motor parts is assembled as a unit structure in one place such as in a bearing maker, or the like. In this manner, bearings and peripheries thereof can be integrated so that the spindle apparatus having the aforementioned configuration can be produced at one place by a bearing maker, or the like. The fact that the spindle apparatus can be produced in one place in this manner brings about a merit that not only the spindle apparatus is excellent in mass productivity but also precision in the non-repeatable run-out of the spindle apparatus can be guaranteed as such a unit structure.

In assembling a motor, the conventional process of bonding the bearing portion is not required, and assembly of the spindle apparatus having the aforementioned configuration has been already completed. Accordingly, the motor can be assembled very easily by a disk device maker.

Because the spindle apparatus in this embodiment has no inner race 1 and has raceways 33 provided directly on the shaft member 7, not only the raceways 33 can be processed with high precision but also the number of parts in the spindle apparatus is reduced so that the cost of production is reduced.

Further, because the pitch circle in each of balls (rolling elements) 3 in the ball bearings A and B is reduced, not only the torque of the bearings is reduced but also the outer diameters of the bearings are reduced. Accordingly, the reduction in size of the spindle apparatus and, accordingly, the reduction in size of the disk device can be attained. That is, the spindle apparatus is adapted to a small-sized disk device.

In the case where the non-repeatable run-out is not so important, the outer races 2 may be bonded to the hub 6 so as to be fixed.

Next, a seventh embodiment of the spindle apparatus according to the fourth aspect of the present invention will be described below with reference to the drawings. In this seventh embodiment, parts the same as or equivalent to those in the aforementioned embodiments are referenced correspondingly.

Figure 12:
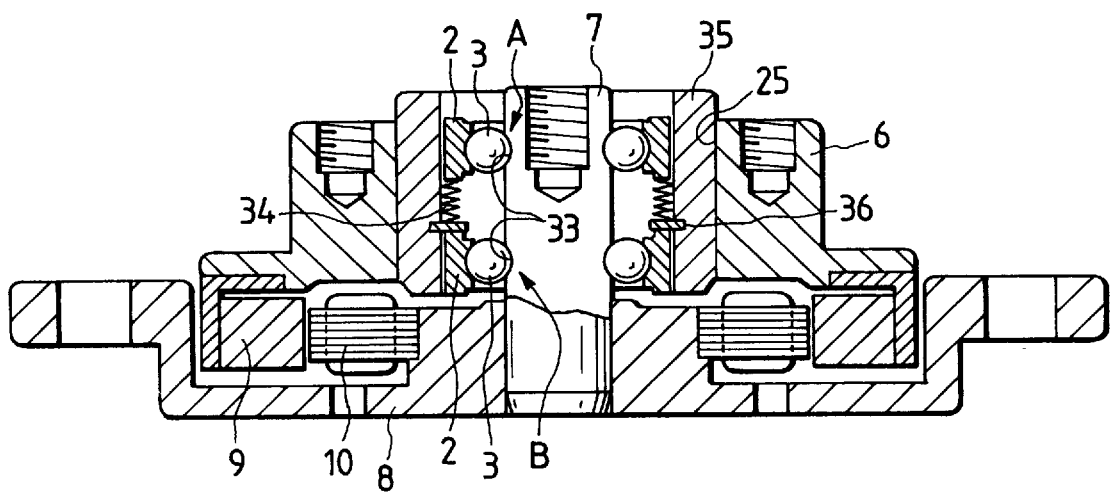
FIG. 12 is a view showing a spindle apparatus according to an embodiment of the present invention.

As shown in FIG. 12, the spindle apparatus in this embodiment is an example in which the spindle apparatus is provided as a unit system on the basis of the spindle apparatus in the sixth embodiment. In order to provide the unit system, a sleeve 35 constituting a rotating body is provided between the outer races 2 of the bearings and the hub 6 so that the outer races 2 of the bearings are attached to the sleeve 35.

Instead of the angular projection 26, an annular groove portion is provided in the inner circumferential surface of the sleeve 35 so as to be formed along the direction of the inner circumference of the sleeve 35. A snap ring 36 is attached into the groove portion to thereby form a step portion. By the step portion, not only preload is given to the outer races 2 as described above but also the saccadic movement between the outer races 2 and the sleeve 35 is prevented even in the case where the outer races 2 are loosely fitted to the inner circumferential surface of the sleeve 35.

In the case where the spindle apparatus provided as a unit structure is attached to the hub 6 having a disk mounted thereon, the sleeve 35 is forced into or loosely fitted to the through-hole 25 of the hub 6 and bonded or spot-welded so as to be fixed.

When the spindle apparatus is provided as a unit system in the aforementioned manner, the unit of the spindle apparatus can be produced by a bearing maker. The unit of the spindle apparatus in which the precision of the bearings is guaranteed by the bearing maker can be provided. Further, the provision of the spindle apparatus as a unit structure in simple configuration is attained.

When a motor is assembled, assembling is completed simply by mounting units to the hub 6 as described above.

Although the above description has been made upon the case where the hub 6 and the shaft member 7 are provided as a rotating body and a fixing member respectively, the spindle apparatus may be designed so that the shaft member 7 is provided as a rotating body. Further, the spindle motor is not structurally limited to a circumferential confront motor and it may be provided as a plane confront motor.

The spindle apparatus according to the present invention can be used not only for a spindle motor of a disk device but also for an information equipment, such as a VTR bearing unit.

When 12 or 18 ceramic balls are used as rolling elements, there is little influence of deformation of races. Accordingly, non-repeatable run-out is small. Furthermore, when a ceramic material is used as a ball material, the mass of the balls is small so that the spin friction at high-speed rotation is small. Accordingly, the frictional torque is small.

Furthermore, because the hardness of the balls is high, the balls are hardly injured and the vibration and noise are hardly increased even in the case where the balls rotate at a high speed for a long time period.

Further, the spindle motor is not structurally limited to a circumferential confront motor and it may be provided as an axis rotating motor or a plane confront motor.

Furthermore, when an angular contact ball bearing is used, large-diameter balls can be used even in the case where the number of rolling elements is 12 or 18. Accordingly, the stiffness of the spindle is improved. Further, because the large-diameter balls facilitate improvement of accuracy, there is a large practical effect.

Further, when the amount of the lubricating agent filled in the bearing is made less than 10% of the spatial volume within the bearing, preferably 8% or less, and more preferably 6% or less, it is possible to reduce the non-repeatable run-out to make the variation thereof smaller.

Incidentally, for application of a ball bearing having 12, 16 or 18 rolling elements to the aforementioned hard disk spindle motor, of course, it is not necessary to limit the fitting of either one of the outer and inner races of the bearing to be loose fitting. That is, even in the case where both the outer race and the inner race are fixed by means of adhesion, forcing-in, or the like, in the same manner as the conventional manner, non-repeatable run-out is improved compared with the conventional spindle motor.

If the rolling elements used for the whole of the above-mentioned embodiments are made of a ceramic or the like resulting in their surface hardness of more than Hv 900, not only the deterioration of the rolling elements can be lowered under the dried-up lubricating condition but also the generation of a fretting in general use or transportation can thereof can be lowered, so that the noise resulted from the bearing in general use, in long time use particularly, can be suppressed.

As aforementioned explanations, when the spindle apparatus according to the present invention is utilized, there is an effect that the non-repeatable run-out of the rolling bearing caused by the geometrical error of the raceway surface can be further reduced by specifying the amount of the lubricant or the number of the rolling element, apart from the improvement of the machining accuracy of the raceway surface or the rolling element surface, that is, the improvement of the geometrical accuracy.

That is, as described above, when the rolling bearing according to the present invention is used, not only there arises an effect that the processing precision on the raceway surfaces and the rolling element surfaces can be improved, that is, geometrical precision can be improved, but also there arises another effect that the non-repeatable run-out of the rolling bearing caused by the geometrical error of the raceway surfaces can be reduced more greatly if the number of rolling elements is specified.

Particularly, if the subject matter of the present invention in which the number of the rolling elements is specified into 12, 16 or 18 is applied to a rolling bearing used for an information equipment or a hard disk spindle motor, as an example of the information equipment, it is possible to improve the rotating accuracy of rotating members of the information equipment to be supported by the such bearing according to the present invention.

Namely, in particular, when the number of rolling elements in each of ball bearings assembled with a hard disk spindle motor is selected to be 12, 16 or 18 according to the one aspect of the present invention, the rotational precision of the spindle motor can be improved more greatly than that of the conventional spindle motor.

Further, if an amount of the lubricating agent is specified to be less than 10% of a spatial volume within the rolling bearing, it becomes possible to reduce the non-repeatable run-out and to holdback a variation of the non-repeatable run-out.

Furthermore, if the surface hardness of the rolling element is specified to be more than Hv 900, it becomes possible to reduce the non-repeatable run-out, to increase the effect for preventing a noise from raising, to prevent the fretting injury from being occurred and to improve a service life in a state of a low non-repeatable run-out.

Further, in combination with ceramic balls, non-repeatable run-out can be reduced. Accordingly, excellent high-speed durability is obtained and there is little increase of vibration and noise. Furthermore, in combination with angular contact ball bearings, the ball bearings are most suitably adapted to a magnetic disk device which is little in repeatable run-out and which requires high stiffness, because the diameter of each ball can be selected to be large.

Of course, when an angular contact ball bearing of oil lubrication having 12 rolling elements formed of a ceramic material is used, the bearing is most suitably used as a bearing for a magnetic disk device.

Accordingly, the high recording density of a hard disk device such as a magnetic disk device, an optical disk device, etc. and the high rotational precision of a machine tool main shaft can be achieved more extremely.

When the spindle apparatus according to the fourth aspect of the present invention is used, the non-repeatable run-out of the spindle apparatus is also reduced and, accordingly, the non-repeatable run-out of a spindle motor assembled with the spindle apparatus is reduced. Accordingly, the high recording density of a disk device using the spindle apparatus and the high rotational precision of a machine tool main shaft can be achieved.

When the feature stated in the one aspect of the present invention is combined with the feature stated in the other aspect of the present invention, the non-repeatable run-out is reduced more greatly. Accordingly, the high recording density of a disk device using the spindle apparatus and the high rotational precision of a machine tool main shaft can be achieved.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing having a plurality of rolling elements interposed between an inner race and an outer race, wherein the number of said rolling elements is selected to be equal to a number having, as at least three divisors, main low-frequency peak components of geometrical error of said inner and outer races to be assembled.

2. The rolling bearing according to claim 1, in which said rolling bearing is a ball bearing for an information equipment and the number of said rolling elements is set to be 12, 16 or 18.

3. The rolling bearing according to claim 1, in which said rolling bearing is a ball bearing for a hard disk spindle apparatus and the number of said rolling elements is set to be 12, 16 or 18.

4. A rolling bearing having a plurality of rolling elements interposed between an inner race and an outer race, and a lubricating agent filled within said rolling bearing, wherein the number of the rolling elements is set to be 12 or more, and an amount of the lubricating agent is set to be less than 10% of a spatial volume within said rolling bearing.

5. The rolling bearing according to claim 4, in which said amount of the lubricating agent is set to be not more than 8% of a spatial volume within said rolling bearing.

6. The rolling bearing according to claim 4, in which said amount of the lubricating agent is set to be not more than 6% of a spatial volume within said rolling bearing.

7. The rolling bearing according to claim 4, in which the surface hardness of the rolling element is set to be more than Hv 900, and said amount of the lubricating agent is set to be not more than 4% of a spatial volume within said rolling bearing.

8. The rolling bearing according to claim 4, in which the surface hardness of the rolling element is set to be more than Hv 900, and said amount of the lubricating agent is set at a value in adjacent to 0% in such a manner that said rolling element is rolled under an oil lubricating condition.

9. A rolling bearing having a plurality of rolling elements interposed between an inner race and an outer race, and a lubricating agent filled within said rolling bearing, wherein the number of the rolling elements is set to be 12 or more, and the surface hardness of the rolling element is set to be more than Hv 900.

10. The rolling bearing according to claim 9, in which said amount of the lubricating agent is set to be less than 10% of a spatial volume within said rolling bearing.

11. The rolling bearing according to claim 9, in which said amount of the lubricating agent is set to be not more than 8% of a spatial volume within said rolling bearing.

12. The rolling bearing according to claim 9, in which said amount of the lubricating agent is set to be not more than 6% of a spatial volume within said rolling bearing.

13. The rolling bearing according to claim 9, in which said amount of the lubricating agent is set to be not more than 4% of a spatial volume within said rolling bearing.

14. The rolling bearing according to claim 9, in which said amount of the lubricating agent is set at a value in adjacent to 0% in such a manner that said rolling element is rolled under an oil lubricating condition.

15. The rolling bearing according claim 14, in which said rolling elements are made of a ceramic.

16. The rolling bearing according claim 9, in which said rolling elements are made of a ceramic.

17. The rolling bearing according claim 9, in which said rolling elements are made of a hard metal.

18. The rolling bearing according claim 9, in which said rolling elements are made of a bearing steel which is subjected to a hardening at temperature of 1200° C. or more.

19. A spindle apparatus in which a rotating body having disks mounted thereon is rotatably supported to a fixing member through two or more support bearings at least one of which is a ball bearing, wherein at least one of outer and inner races constituting said ball bearing is loosely fitted to said rotating body or said fixing member.

20. The spindle apparatus according to claim 19, further comprising:

a cushioning member disposed between the inner circumference of the inner race and said rotating body or said fixing member.

21. The spindle apparatus according to claim 19, further comprising:

a cushioning member disposed between the outer circumference of the outer race and said rotating body or said fixing member.

22. The spindle apparatus according to claim 21, in which said ball bearing comprises a plurality of balls interposed between said inner race and said outer race, and the number of said balls is set to be 12, 16 or 18.

23. The spindle apparatus according to claim 22, in which said ball bearing comprises a plurality of balls interposed between said inner race and said outer race, and the surface hardness of the balls is set to be more than Hv 900.

24. A rolling bearing including a plurality of rolling elements interposed between an inner race and an outer race, said number of said rolling elements being selected by the steps comprising:

setting the number of said rolling element to be equal to a number having, as divisors, said main low-frequency peak components of geometrical error of said inner and outer races to be assembled.

25. The rolling bearing according to claim 24, in which said setting steps comprises the steps of:

setting the number of said rolling element to be equal to a number having, as at least three divisors, said main low-frequency peak components.

26. The rolling bearing according to claim 25, in which said setting steps comprises the steps of:

setting the number of said rolling element to be equal to a number having, as at least three divisors of from 2 to 10, said main low-frequency peak components.

27. The rolling bearing according to claim 26, in which the number of the rolling elements is set to be 12, 16 or 18.

28. The rolling bearing according to claim 26, in which said rolling bearing comprises a rolling bearing used for an information equipment.

29. The rolling bearing according to claim 26, in which said rolling bearing comprises a ball bearing for a hard disk spindle apparatus.

* * * * *